US007576150B2

(12) United States Patent
Klei et al.

(10) Patent No.: US 7,576,150 B2
(45) Date of Patent: Aug. 18, 2009

(54) POLY(ARYLENE ETHER) COMPOSITION, METHOD, AND ARTICLE

(75) Inventors: Steven Raymond Klei, Guilderland, NY (US); James Edward Pickett, Schenectady, NY (US); James Jun Xu, Niskayuna, NY (US)

(73) Assignee: Sabic Innovative Plastics IP B.V. (NL)

( * ) Notice: Subject to any disclaimer, the term of this patent is extended or adjusted under 35 U.S.C. 154(b) by 263 days.

(21) Appl. No.: 11/680,079

(22) Filed: Feb. 28, 2007

(65) Prior Publication Data

US 2008/0206468 A1 Aug. 28, 2008

(51) Int. Cl.
C08K 5/521 (2006.01)
C08K 5/3472 (2006.01)
C08K 5/13 (2006.01)
C08K 5/01 (2006.01)

(52) U.S. Cl. .................. 524/127; 524/91; 524/94; 524/100; 524/140; 524/141; 524/335; 524/336; 524/352; 524/356; 524/474

(58) Field of Classification Search .................. 524/117, 524/140, 141, 91, 94, 100, 127, 335, 336, 524/352, 356, 474
See application file for complete search history.

(56) References Cited

U.S. PATENT DOCUMENTS

| 4,218,364 A | | 8/1980 | Cooper et al. | |
|---|---|---|---|---|
| 4,315,848 A | | 2/1982 | Dexter et al. | |
| 4,493,915 A | | 1/1985 | Lohmeijer | |
| 4,529,652 A | * | 7/1985 | Bussink et al. | 428/379 |
| 4,551,494 A | | 11/1985 | Lohmeijer | |
| 4,555,538 A | | 11/1985 | Shu | |
| 4,636,408 A | | 1/1987 | Anthony et al. | |
| 4,665,112 A | | 5/1987 | Berdahl | |
| 4,668,739 A | | 5/1987 | Berdahl et al. | |
| 4,785,076 A | | 11/1988 | Shu | |
| 4,835,201 A | | 5/1989 | Bopp | |
| 4,843,116 A | | 6/1989 | Bopp | |
| 5,001,181 A | * | 3/1991 | Takagi et al. | 524/401 |
| 5,045,578 A | | 9/1991 | Claesen et al. | |
| 5,055,494 A | | 10/1991 | van der Meer | |
| 5,278,220 A | * | 1/1994 | Vermeire et al. | 524/490 |
| 5,294,655 A | * | 3/1994 | Lee et al. | 524/265 |
| 5,397,822 A | | 3/1995 | Lee | |
| 5,478,878 A | | 12/1995 | Nagaoka et al. | |
| 5,672,644 A | | 9/1997 | Inoue | |
| 6,025,419 A | | 2/2000 | Kasowski et al. | |
| 6,077,893 A | | 6/2000 | Yates | |
| 7,217,885 B2 | | 5/2007 | Mhetar et al. | |
| 7,220,917 B2 | | 5/2007 | Mhetar et al. | |
| 2006/0068317 A1 | | 3/2006 | Klei et al. | |
| 2006/0106139 A1 | | 5/2006 | Kosaka et al. | |
| 2006/0131050 A1 | | 6/2006 | Mhetar et al. | |
| 2006/0131052 A1 | | 6/2006 | Mhetar et al. | |
| 2006/0131053 A1 | | 6/2006 | Kubo et al. | |
| 2006/0131059 A1 | | 6/2006 | Xu et al. | |
| 2006/0134416 A1 | | 6/2006 | Kubo et al. | |
| 2006/0135661 A1 | | 6/2006 | Mhetar et al. | |
| 2006/0135695 A1 | | 6/2006 | Guo et al. | |
| 2006/0247338 A1 | | 11/2006 | Klei et al. | |
| 2008/0206449 A1 | | 8/2008 | Klei et al. | |
| 2008/0206468 A1 | | 8/2008 | Klei et al. | |

FOREIGN PATENT DOCUMENTS

| EP | 0146879 | 7/1985 |
|---|---|---|
| EP | 0413972 B1 | 2/1991 |
| EP | 0467113 | 1/1992 |
| EP | 0719832 | 7/1996 |
| GB | 2043083 | 10/1980 |
| WO | 98/08898 A1 | 3/1998 |
| WO | 2006065519 A1 | 6/2006 |

OTHER PUBLICATIONS

International Search Report; International Application No. PCT/US2008/054635; International Filing Date Feb. 22, 2008; Date of Mailing Sep. 19, 2008 (6 pages).
Written Opinion of the International Searching Authority; International Application No. PCT/US2008/054635; International Filing Date Feb. 22, 2008; 6 pages).
International Searching Authority, International Search Report, International Application No. PCT/US2008/054634, Mailing date: Oct. 10, 2008, 7 pages.
International Searching Authority, Written Opinion, International Application No. PCT/US2008/054634, Mailing date: Oct. 10, 2008, 6 pages.
U.S. Appl. No. 11/680,077, filed Feb. 28, 2007.
U.S. Appl. No. 12/208,556, filed Sep. 11, 2008.
A. R. Patel et al., "Ultraviolet Stabilization of Polymers: Development with Hindered-Amine Light Stabilizers", Stabilization and Degradation of polymers, Advances in Chemistry Series, No. 169, American Chemical Society, Wash., D.C., 116-132 (1978).
James E. Pickett, "Photodegradation and Stabilization of PPO® Resin Blends", in Gerald Scott, ed., "Mechanisms of Polymer Degradation and Stabilization", Essex, England: Elsevier (1990), pp. 135-167.
Material Data Safety Sheet; Product Name: ERL 4221; MSDS Prepared Jan. 2005 (2 pages).

(Continued)

*Primary Examiner*—Peter Szekely
(74) *Attorney, Agent, or Firm*—Cantor Colburn LLP

(57) ABSTRACT

A thermoplastic composition includes particular amounts of a poly(arylene ether), a hydrogenated block copolymer, a copolymer of ethylene and an alpha-olefin, a plasticizer, a white pigment, and an ultraviolet radiation stabilizer. The composition exhibits excellent light stability, and it is particularly useful for forming white or off-white cable insulation.

38 Claims, No Drawings

OTHER PUBLICATIONS

Safety Data Sheet; Product Name: INDOPOL® H-35, H-50, H-100, H-300, H-1200; Date of Issue Jan. 14, 2003 (5 pages).

H. Zweifel, Ed., Section 2.2.16, "Photo-oxidation of PPE", Plastics Additives Handbook, 5$^{th}$ Edition, Cincinatti: Hanser Gardner Publications, Inc. (2001), pp. 195-200.

H. Zweifel, Ed., Section 2.3, "Mechanisms of UV Stabilization", Plastics Additives Handbook, 5$^{th}$ Edition, Cincinatti: Hanser Gardner Publications, Inc. (2001), pp. 206-238.

H. Zweifel, Ed., Section 2.6.13, "Stabilization of Polyphenylene Ethers", Plastics Additives Handbook, 5$^{th}$ Edition, Cincinatti: Hanser Gardner Publications, Inc. (2001), pp. 195-200.

ASTM D2244-02 Standard Practice for Calculation of Color Tolerances and Color Differences from Instrumentally Measured Color Coordinates (10 pages).

ASTM D4459-099 Standard Practice for Xenon-Arc Exposure of Plastics Intended for Indoor Applications (4 pages).

ASTM D790-03 Standard Test Methods for Flexural Properties of Unreinforced and Reinforced Plastics and Electrical Insulating Materials (11 pages).

ASTM D638-03 Standard Test Method for Tensile Properties of Plastics (15 pages).

ASTM D1510-06a Standard Test Method for Carbon Black-Iodine Adsorption Number (8 pages).

ASTM D150-98 (Reapproved 2004) Standard Test Methods for AC Loss Characteristics and Permittivity (Dielectric Constant) of Solid Electrical Insulation (20 pages).

UL 94 Tests for Flammability of Plastic Materials for Parts in Devices and Appliances; Dec. 12, 2003 (52 pages).

ASTM D1238-04 Standard Test Method for Melt Flow Rates of Thermoplastics by Extrusion Plastometer (13 pages).

ASTM D3418-03 Standard Test Method for Transition Temperatures and Enthalpies of Fusion and Crystallization of Polymers by Differential Scanning Calorimetry (7 pages).

SPI Supplies, Material Safety Data Sheet for ERL-4221 Epoxy Plasticizer (2009) Available Online at: http://www.2spi.com/catalog/msds/msds02815.html.

Ineos Oligomers. Indopol Polybutene Product Data (2007) Available Online at: http://www.ineosoligomers.com/173-Indopol_Polybutene_Product_Data.htm.

Hawley's Condensed Chemical Dictionary, 13th edition, 1997, pp. 703-704 1977.

U.S. Appl. No. 12/208,556 Office Action dated Feb. 12, 2009, 30 pages.

\* cited by examiner

POLY(ARYLENE ETHER) COMPOSITION, METHOD, AND ARTICLE

BACKGROUND OF THE INVENTION

Poly(arylene ether) resin is a type of plastic known for its excellent water resistance, dimensional stability, and inherent flame retardancy. Properties such as strength, stiffness, chemical resistance, and heat resistance can be tailored by blending it with various other plastics in order to meet the requirements of a wide variety of consumer products, for example, plumbing fixtures, electrical boxes, automotive parts, and insulation for wire and cable.

Poly(vinyl chloride) is currently the commercial dominant material for flame retardant wire and cable insulation. However, poly(vinyl chloride) is a halogenated material. There is mounting concern over the environmental impact of halogenated materials, and non-halogenated alternatives are being sought. There is therefore a strong desire—and in some places a legislative mandate—to replace poly(vinyl chloride) with non-halogenated polymer compositions. Given the popularity of white-colored small appliances and personal electronic devices, there is also a particular need for white or off-white colored cable insulation compositions that retain their color after photochemical aging.

Recent research has demonstrated that halogen-free poly (arylene ether) compositions can possess the physical and flame retardant properties needed for use as wire and cable insulation. See, for example, U.S. Patent Application Publication Nos. US 2006/131050 A1 and US 2006/131052 A1 and US 2006/135661 A1 of Mhetar et al., US 2006/131053 A1 and US 2006/134416 A1 of Kubo et al., US 2006/131059 A1 of Xu et al., and US 2006/135695 A1 of Guo et al. However, the compositions disclosed in these references are difficult to formulate in a white or off-white color, or they exhibit insufficient thermal or photochemical color stability, or both. And, while the problem of photochemical yellowing of poly (arylene ether)-containing compositions has long been known, existing solutions to this problem are either ineffective or impractical for white and off-white wire and cable insulation. For example, in one approach, photochemical yellowing of the poly(arylene ether) is compensated for by the incorporation of a photobleachable dye. See, for example, U.S. Pat. Nos. 4,493,915 and 4,551,494 to Lohmeijer. This approach is not effective in white and off-white poly(arylene ether) compositions because the presence of the photobleachable dye is incompatible with the desired white or off-white color. In another approach, the surface of an article comprising a polyphenylene ether and a second resin is treated with solvent to selectively remove polyphenylene ether from the surface of the article. See, for example, U.S. Pat. No. 5,055,494 to van der Meer. This approach is impractical for wire and cable insulation because of the large surface area that would need to be solvent treated.

There therefore remains a need for white and off-white colored poly(arylene ether) compositions that exhibit the physical and flame retardant properties required for wire and cable insulation and further exhibit color stability after prolonged light exposure.

BRIEF DESCRIPTION OF THE INVENTION

The above-described and other drawbacks are alleviated by a composition, comprising: about 10 to about 45 weight percent of a poly(arylene ether); about 5 to about 40 weight percent of a hydrogenated block copolymer of an alkenyl aromatic compound and a conjugated diene; about 10 to about 55 weight percent of a copolymer of ethylene and a $C_3$-$C_{12}$ alpha-olefin; about 8 to about 25 weight percent of a plasticizer; about 1 to about 12 weight percent of a white pigment; and about 0.1 to about 5 weight percent of an ultraviolet radiation stabilizer; wherein the composition comprises less than or equal to 20 weight percent of rubber-modified polystyrene; wherein all weight percents are based on the total weight of the composition; and wherein the composition exhibits a CIE lightness value, L*, value of at least 70 measured according to ASTM D2244, and a CIELAB color shift, ΔE, less than or equal to 3 measured according to ASTM D2244 after 300 hours exposure to xenon arc exposure according to ASTM D4459.

Another embodiment is a composition, comprising: about 25 to about 45 weight percent of a poly(2,6-dimethyl-1,4-phenylene ether); about 20 to about 35 weight percent of a polystyrene-poly(ethylene-butylene)-polystyrene triblock copolymer; about 10 to about 30 weight percent of a linear low density polyethylene; about 2 to about 10 weight percent of a polybutene; about 8 to about 25 weight percent of bisphenol A bis(diphenyl phosphate), resorcinol bis(diphenyl phosphate), or a mixture thereof; about 4 to about 10 weight percent of magnesium hydroxide; about 4 to about 11 weight percent of melamine polyphosphate; about 2 to about 6 weight percent of titanium dioxide; about 0.1 to about 0.6 weight percent of a cycloaliphatic epoxy resin; about 0.3 to about 0.7 weight percent of a hydroxyphenyl benzotriazole; and about 0.6 to about 1.5 weight percent of a bis(piperidinyl) sebacate; wherein all weight percents are based on the total weight of the composition; and wherein the composition exhibits a CIE lightness value, L*, value of about 80 to about 90, a CIE a* value of about −1.5 to about 0.5, a CIE b* value of about −2.5 to about 1.5, a CIELAB color shift, ΔE, of about 0.1 to about 2, measured according to ASTM D2244 after 300 hours exposure to xenon arc exposure according to ASTM D4459, and a flexural modulus of about 50 to about 100 megapascals, measured at 23° C. according to ASTM D790.

Another embodiment is a method of preparing a thermoplastic composition, comprising: melt kneading about 10 to about 45 weight percent of a poly(arylene ether), about 5 to about 40 weight percent of a hydrogenated block copolymer of an alkenyl aromatic compound and a conjugated diene, about 10 to about 55 weight percent of a copolymer of ethylene and a $C_3$-$C_{12}$ alpha-olefin, about 8 to about 25 weight percent of a plasticizer, about 1 to about 12 weight percent of a white pigment, and about 0.1 to about 5 weight percent of an ultraviolet radiation stabilizer; wherein the composition comprises less than or equal to 20 weight percent of rubber-modified polystyrene; wherein all weight percents are based on the total weight of the composition; and wherein the composition exhibits a CIE lightness value, L*, value of at least 70 measured according to ASTM D2244, and a CIE color shift, ΔE, less than or equal to 3 measured according to ASTM D2244 after 300 hours exposure to xenon arc exposure according to ASTM D4459.

Another embodiment is a method of preparing a thermoplastic composition, comprising: melt kneading about 25 to about 45 weight percent of a poly(2,6-dimethyl-1,4-phenylene ether), about 20 to about 35 weight percent of a polystyrene-poly(ethylene-butylene)-polystyrene triblock copolymer, about 10 to about 30 weight percent of a linear low density polyethylene, about 2 to about 10 weight percent of a polybutene, about 8 to about 25 weight percent of bisphenol A bis(diphenyl phosphate) or resorcinol bis(diphenyl phosphate) or a mixture thereof, about 4 to about 10 weight percent of magnesium hydroxide, about 4 to about 11 weight percent of melamine polyphosphate, about 2 to about 6 weight percent of titanium dioxide, about 0.1 to about 0.6 weight percent of a cycloaliphatic epoxy resin, about 0.3 to about 0.7 weight percent of a hydroxyphenyl benzotriazole, and about 0.6 to about 1.5 weight percent of a bis(piperidinyl) sebacate; wherein all weight percents are based on the total weight of the composition; and wherein the composition exhibits a CIE lightness value, L*, value of about 80 to about 90, a CIE a* value of about −1.5 to about 0.5, a CIE b* value of about −2.5 to about 1.5, a CIELAB color shift, ΔE, of about 0.1 to about 2, measured according to ASTM D2244 after 300 hours exposure to xenon arc exposure according to ASTM D4459, and a flexural modulus of about 50 to about 100 megapascals, measured at 23° C. according to ASTM D790.

Another embodiment is a method of insulating an electrical wire, comprising: extrusion coating an electrical wire with a composition comprising about 10 to about 45 weight percent of a poly(arylene ether), about 5 to about 40 weight percent of a hydrogenated block copolymer of an alkenyl aromatic compound and a conjugated diene, about 10 to about 55 weight percent of a copolymer of ethylene and a $C_3$-$C_{12}$ alpha-olefin, about 8 to about 25 weight percent of a plasticizer, about 1 to about 12 weight percent of a white pigment, and about 0.1 to about 5 weight percent of an ultraviolet radiation stabilizer; wherein the composition comprises less than or equal to 20 weight percent of rubber-modified polystyrene; wherein all weight percents are based on the total weight of the composition; and wherein the composition exhibits a CIE lightness value, L*, value of at least 70 measured according to ASTM D2244, and a CIE color shift, ΔE, less than or equal to 3 measured according to ASTM D2244 after 300 hours exposure to xenon arc exposure according to ASTM D4459.

Another embodiment is a method of insulating an electrical wire, comprising: extrusion coating an electrical wire with a composition comprising about 25 to about 45 weight percent of a poly(2,6-dimethyl-1,4-phenylene ether), about 20 to about 35 weight percent of a polystyrene-poly(ethylene-butylene)-polystyrene triblock copolymer, about 10 to about 30 weight percent of a linear low density polyethylene, about 2 to about 10 weight percent of a polybutene, about 8 to about 25 weight percent of bisphenol A bis(diphenyl phosphate) or resorcinol bis(diphenyl phosphate) or a mixture thereof, about 4 to about 10 weight percent of magnesium hydroxide, about 4 to about 11 weight percent of melamine polyphosphate, about 2 to about 6 weight percent of titanium dioxide, about 0.1 to about 0.6 weight percent of a cycloaliphatic epoxy resin, about 0.3 to about 0.7 weight percent of a hydroxyphenyl benzotriazole, and about 0.6 to about 1.5 weight percent of a bis(piperidinyl)sebacate; wherein all weight percents are based on the total weight of the composition; and wherein the composition exhibits a CIE lightness value, L*, value of about 80 to about 90, a CIE a* value of about −1.5 to about 0.5, a CIE b* value of about −2.5 to about 1.5, a CIELAB color shift, ΔE, of about 0.1 to about 2, measured according to ASTM D2244 after 300 hours exposure to xenon arc exposure according to ASTM D4459, and a flexural modulus of about 50 to about 100 megapascals, measured at 23° C. according to ASTM D790.

Other embodiments, including articles comprising the composition and particularly cable insulation comprising the composition, are described in detail below.

DETAILED DESCRIPTION OF THE INVENTION

The present inventors have conducted research on flexible poly(arylene ether) compositions, searching for white and off-white compositions with substantially improved light stability. It was known at the outset of this work that poly (arylene ether)s and their blends with polystyrenes, polyamides, and polyolefin homopolymers exhibit poor light stability. Specifically, it was known that poly(arylene ether) yellows on exposure to ultraviolet (UV) and visible light, including fluorescent light. The inventors initially focused on flexible blends comprising poly(arylene ether) and rubber-modified polystyrene. Although the UV stability of these blends could be improved by the incorporation of UV stabilizing additives, the resulting compositions exhibited either insufficient initial lightness or insufficient UV stability. Blends comprising poly(arylene ether) and hydrogenated block copolymer often exhibited acceptable initial lightness, but their UV stability was often inferior to that of poly (arylene ether)/rubber-modified polystyrene blends. The inventors then fortuitously discovered that compositions comprising poly(arylene ether), hydrogenated block copolymer, a plasticizer for the poly(arylene ether), and UV stabilizing additives, each in particular amounts, provided a substantial and unexpected improvement in UV stability. As demonstrated in the working examples below, this UV stability advantage is lost when another impact modifier, such as high-impact polystyrene (HIPS), is substituted for the hydrogenated block copolymer, or when the plasticizer is omitted. Thus, there appears to be a three-way interaction between the poly(arylene ether), the hydrogenated block copolymer, and the plasticizer that increases the effectiveness of the UV stabilizing additives. This complex interaction of components was unexpected, and it provides unprecedented UV stability for light-colored, flexible poly(arylene ether) compositions having the particular component amounts claimed herein. In particular, the flexible poly(arylene ether) compositions exhibit an initial CIE lightness value, L*, value of at least 70, and a CIE color shift, ΔE, less than or equal to 3 measured according to ASTM D2244 after 300 hours exposure to xenon arc exposure. The present inventors further unexpectedly found that a similar UV stabilizing effect is observed in compositions substituting a copolymer of ethylene and a $C_3$-$C_{12}$ alpha-olefin for a portion of the hydrogenated block copolymer of the embodiment described above. These discoveries represent very significant breakthroughs, because they allow flexible poly(arylene ether) compositions to be used in place of poly(vinyl chloride) for white and off-white colored wire and cable insulation.

Thus, one embodiment is a composition, comprising: about 10 to about 45 weight percent of a poly(arylene ether); about 9 to about 80 weight percent of a hydrogenated block copolymer of an alkenyl aromatic compound and a conjugated diene; about 8 to about 25 weight percent of a plasticizer; about 1 to about 12 weight percent of a white pigment; and about 0.1 to about 5 weight percent of an ultraviolet radiation stabilizer; wherein the hydrogenated block copolymer and the poly(arylene ether) are present in a weight ratio of about 0.3 to about 4; wherein the composition comprises less than or equal to 20 weight percent of rubber-modified polystyrene; wherein the composition is substantially free of polyethylene homopolymers and polypropylene homopolymers; wherein all weight percents are based on the total weight of the composition; and wherein the composition exhibits a CIE lightness value, L*, value of at least 70 measured according to ASTM D2244, and a CIELAB color shift, ΔE, less than or equal to 3 measured according to ASTM D2244 after 300 hours exposure to xenon arc exposure according to ASTM D4459.

Another embodiment is a composition, comprising: about 10 to about 45 weight percent of a poly(arylene ether); about 5 to about 40 weight percent of a hydrogenated block copolymer of an alkenyl aromatic compound and a conjugated diene; about 10 to about 55 weight percent of a copolymer of ethylene and a $C_3$-$C_{12}$ alpha-olefin; about 8 to about 25 weight percent of a plasticizer; about 1 to about 12 weight percent of a white pigment; and about 0.1 to about 5 weight percent of an ultraviolet radiation stabilizer; wherein the composition comprises less than or equal to 20 weight percent of rubber-modified polystyrene; wherein all weight percents are based on the total weight of the composition; and wherein the composition exhibits a CIE lightness value, L*, value of at least 70 measured according to ASTM D2244, and a CIELAB color shift, ΔE, less than or equal to 3 measured according to ASTM D2244 after 300 hours exposure to xenon arc exposure according to ASTM D4459.

The composition comprises a poly(arylene ether). In some embodiments, the poly(arylene ether) comprises repeating structural units having the formula

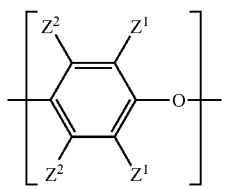

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio (that is, ($C_1$-$C_{12}$ hydrocarbyl)S—), $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties.

In some embodiments, the poly(arylene ether) comprises 2,6-dimethyl-1,4-phenylene ether units, 2,3,6-trimethyl-1,4-phenylene ether units, or a combination thereof.

The poly(arylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(arylene ether) can be in the form of a homopolymer, a copolymer, a graft copolymer, an ionomer, or a block copolymer, as well as combinations comprising at least one of the foregoing.

The poly(arylene ether) can have a number average molecular weight of about 3,000 to about 40,000 atomic mass units (AMU) and a weight average molecular weight of about 5,000 to about 80,000 AMU, as determined by gel permeation chromatography using monodisperse polystyrene standards, a styrene divinyl benzene gel at 40° C. and samples having a concentration of 1 milligram per milliliter of chloroform. The poly(arylene ether) can have an intrinsic viscosity of about 0.05 to about 1.0 deciliter per gram (dL/g), as measured in chloroform at 25° C., specifically about 0.1 to about 0.8 dL/g, more specifically about 0.2 to about 0.6 dL/g, even more specifically about 0.3 to about 0.6 dL/g. Those skilled in the art understand that intrinsic viscosity of a poly(arylene ether) can increase by up to 30% on melt kneading. The above intrinsic viscosity range of 0.05 to about 1.0 deciliter per gram is intended to encompass intrinsic viscosities both before and after melt kneading to form the composition. A blend of poly(arylene ether) resins having different intrinsic viscosities can be used.

The composition comprises about 10 to about 45 weight percent of the poly(arylene ether), based on the total weight of the composition. Within this range, the poly(arylene ether) amount specifically may be about 15 to about 40 weight percent, more specifically about 18 to about 36 weight percent, even more specifically about 21 to about 30 weight percent, still more specifically about 21 to about 25 weight percent.

In addition to the poly(arylene ether), the composition comprises a hydrogenated block copolymer of an alkenyl aromatic compound and a conjugated diene. For brevity, this component is referred to herein as the "hydrogenated block copolymer". The hydrogenated block copolymer may comprise about 10 to about 90 weight percent of poly(alkenyl aromatic) content and about 90 to about 10 weight percent of hydrogenated poly(conjugated diene) content. In some embodiments, the poly(alkenyl aromatic) content is about 10 to 45 weight percent, specifically about 20 to about 40 weight percent. In other embodiments, the poly(alkenyl aromatic) content is greater than 45 weight percent to about 90 weight percent, specifically about 55 to about 80 weight percent. The hydrogenated block copolymer can have a weight average molecular weight of about 40,000 to about 400,000 atomic mass units. As for the poly(arylene ether) component, the number average molecular weight and the weight average molecular weight may be determined by gel permeation chromatography and based on comparison to polystyrene standards. In some embodiments, the hydrogenated block copolymer has a weight average molecular weight of 200,000 to about 400,000 atomic mass units, specifically 220,000 to about 350,000 atomic mass units. In other embodiments, the hydrogenated block copolymer can have a weight average molecular weight of about 40,000 to less than 200,000 atomic mass units, specifically about 40,000 to about 180,000 atomic mass units, more specifically about 40,000 to about 150,000 atomic mass units.

The alkenyl aromatic monomer used to prepare the hydrogenated block copolymer can have the structure

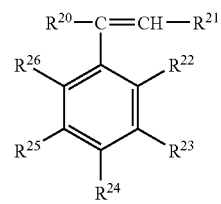

wherein $R^{20}$ and $R^{21}$ each independently represent a hydrogen atom, a $C_1$-$C_8$ alkyl group, or a $C_2$-$C_8$ alkenyl group; $R^{22}$ and $R^{26}$ each independently represent a hydrogen atom, a $C_1$-$C_8$ alkyl group, a chlorine atom, or a bromine atom; and $R^{23}$, $R^{24}$, and $R^{25}$ each independently represent a hydrogen atom, a $C_1$-$C_8$ alkyl group, or a $C_2$-$C_8$ alkenyl group, or $R^{23}$ and $R^{24}$ are taken together with the central aromatic ring to form a naphthyl group, or $R^{24}$ and $R^{25}$ are taken together with the central aromatic ring to form a naphthyl group. Specific alkenyl aromatic monomers include, for example, styrene, chlorostyrenes such as p-chlorostyrene, and methylstyrenes such as alpha-methylstyrene and p-methylstyrene. In some embodiments, the alkenyl aromatic monomer is styrene.

The conjugated diene used to prepare the hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene consists of 1,3-butadiene.

The hydrogenated block copolymer is a copolymer comprising (A) at least one block derived from an alkenyl aromatic compound and (B) at least one block derived from a conjugated diene, in which the aliphatic unsaturated group content in the block (B) is at least partially reduced by hydrogenation. In some embodiments, the aliphatic unsaturation in the (B) block is reduced by at least 50 percent, specifically at least 70 percent. The arrangement of blocks (A) and (B) includes a linear structure, a grafted structure, and a radial teleblock structure with or without a branched chain. Linear block copolymers include tapered linear structures and non-tapered linear structures. In some embodiments, the hydrogenated block copolymer has a tapered linear structure. In some embodiments, the hydrogenated block copolymer has a non-tapered linear structure. In some embodiments, the hydrogenated block copolymer comprises a B block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B, wherein the molecular weight of each A block may be the same as or different from that of other A blocks, and the molecular weight of each B block may be the same as or different from that of other B blocks. In some embodiments, the hydrogenated block copolymer is a diblock copolymer, a triblock copolymer, or a combination thereof.

In some embodiments, the hydrogenated block copolymer is a polystyrene-poly(ethylene-butylene)-polystyrene triblock copolymer. In some embodiments, the hydrogenated block copolymer is a polystyrene-poly(ethylene-propylene) diblock copolymer. These block copolymers do not include the residue of any functionalizing agents or any monomers other than those indicated by their names.

In some embodiments, the hydrogenated block copolymer excludes the residue of monomers other than the alkenyl aromatic compound and the conjugated diene. In some embodiments, the hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms.

In some embodiments, the hydrogenated block copolymer includes the residue of one or more acid functionalizing agents, such as maleic anhydride.

Methods for preparing hydrogenated block copolymers are known in the art and many hydrogenated block copolymers are commercially available. Illustrative commercially available hydrogenated block copolymers include the polystyrene-poly(ethylene-propylene)diblock copolymers available from Kraton Polymers as Kraton G1701 and G1702; the polystyrene-poly(ethylene-butylene)-polystyrene triblock copolymers available from Kraton Polymers as Kraton G1641, G1650, G1651, G1654, G1657, G1726, G4609, G4610, GRP-6598, RP-6924, MD-6932M, MD-6933, and MD-6939; the polystyrene-poly(ethylene-butylene-styrene)-polystyrene (S-EB/S—S) triblock copolymers available from Kraton Polymers as Kraton RP-6935 and RP-6936, the polystyrene-poly(ethylene-propylene)-polystyrene triblock copolymers available from Kraton Polymers as Kraton G1730; the maleic anhydride-grafted polystyrene-poly(ethylene-butylene)-polystyrene triblock copolymers available from Kraton Polymers as Kraton G1901, G1924, and MD-6684; the maleic anhydride-grafted polystyrene-poly(ethylene-butylene-styrene)-polystyrene triblock copolymer available from Kraton Polymers as Kraton MD-6670; the polystyrene-poly(ethylene-butylene)-polystyrene triblock copolymer comprising 67 weight percent polystyrene available from AK Elastomer as TUFTEC H1043; the polystyrene-poly(ethylene-butylene)-polystyrene triblock copolymer comprising 42 weight percent polystyrene available from AK Elastomer as TUFTEC H1051; the polystyrene-poly(butadiene-butylene)-polystyrene triblock copolymers available from AK Elastomer as TUFTEC P1000 and P2000; the polystyrene-polybutadiene-poly(styrene-butadiene)-polybutadiene block copolymer available from AK Elastomer as S.O.E.-SS L601; the hydrogenated radial block copolymers available from Chevron Phillips Chemical Company as K-Resin KK38, KR01, KR03, and KR05; the polystyrene-poly(ethylene-butylene)-polystyrene triblock copolymer comprising about 60 weight polystyrene available from Kuraray as SEPTON S8104; the polystyrene-poly(ethylene-ethylene/propylene)-polystyrene triblock copolymers available from Kuraray as SEPTON S4044, S4055, S4077, and S4099; and the polystyrene-poly(ethylene-propylene)-polystyrene triblock copolymer comprising about 65 weight percent polystyrene available from Kuraray as SEPTON S2104. Mixtures of two of more hydrogenated block copolymers may be used.

The composition comprises the hydrogenated block copolymer in an amount of about 9 to about 80 weight percent, based on the total weight of the composition. Within this range, the hydrogenated block copolymer amount may be specifically about 10 to about 60 weight percent, more specifically about 15 to about 60 weight percent, still more specifically about 20 to about 50 weight percent, even more specifically about 23 to about 40 weight percent, yet more specifically about 27 to about 32 weight percent.

In some embodiments, at least a portion of the hydrogenated block copolymer is provided in the form of a melt-kneaded blend comprising hydrogenated block copolymer, an ethylene-propylene copolymer, and mineral oil. In this context, the term "melt-kneaded blend" means that the hydrogenated block copolymer, the ethylene-propylene copolymer, and the mineral oil are melt-kneaded with each other before being melt-kneaded with other components. The ethylene-propylene copolymer in this melt-kneaded blend is an elastomeric copolymer (that is, a so-called ethylene-propylene rubber (EPR)). Suitable ethylene-propylene copolymers are described below in the context of the optional ethylene/alpha-olefin copolymer. In these blends, the hydrogenated block copolymer amount may be about 20 to about 60 weight percent, specifically about 30 to about 50 weight percent; the ethylene-propylene copolymer amount may be about 2 to about 20 weight percent, specifically about 5 to about 15 weight percent; and the mineral oil amount may be about 30 to about 70 weight percent, specifically about 40 to about 60 weight percent; wherein all weight percents are based on the total weight of the melt-kneaded blend.

The hydrogenated block copolymer and the poly(arylene ether) are present in a weight ratio of about 0.3 to about 4. In other words, the weight ratio of the hydrogenated block copolymer to the poly(arylene ether) is about 0.3:1 to about 4:1.) Within this range, the weight ratio of the hydrogenated block copolymer to the poly(arylene ether) may be specifically about 0.7 to about 3, more specifically about 1.2 to about 3, even more specifically about 1.2 to about 1.5.

In addition to the poly(arylene ether) and the hydrogenated block copolymer, the composition comprises a plasticizer. As used herein, the term "plasticizer" refers to a compound that is effective to plasticize the composition as a whole or at least one component of the composition. In some embodiments, the plasticizer is effective to plasticize the poly(arylene ether). The plasticizers are typically low molecular weight, relatively nonvolatile molecules that dissolve in a polymer, separating the chains from each other and hence facilitating reptation and reducing the glass transition temperature of the composition. In some embodiments, the plasticizer has a glass transition temperature ($T_g$) of about –110 to –50° C., is miscible primarily with poly(arylene ether)resin, and has a molecular weight less than or equal to 1,000 grams per mole.

Suitable plasticizers include, for example, benzoate esters (including dibenzoate esters), pentaerythritol esters, triaryl phosphates (including halogen substituted triaryl phosphates), phthalate esters, trimellitate esters, pyromellitate esters, and the like, and mixtures thereof.

In some embodiments, the plasticizer is a triaryl phosphate. Suitable triaryl phosphates include those having the structure

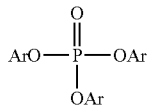

wherein each aryl group, Ar, is independently a directly bound $C_6$-$C_{12}$ aromatic group optionally substituted with one or more substituents selected from $C_1$-$C_{12}$ hydrocarbyl, $C_1$-$C_{12}$ hydrocarbyloxy, halogen, hydroxy, nitro, cyano, carboxy, and the like. Illustrative examples include triphenyl phosphate, tritolyl phosphate, isopropylated triphenyl phosphate, butylated triphenyl phosphate, and the like. Triaryl phosphates further include molecules wherein two or more diaryl phosphate groups are each bound to one or more aryl fragments of a linking group. Illustrative examples include resorcinol bis(diphenyl phosphate) ("RDP"; CAS Reg. No. 57583-54-7; Phosphoric acid, 1,3-phenylene tetraphenyl ester) and bisphenol A bis(diphenyl phosphate) ("BPADP"; CAS Reg. No. 5945-33-5; phosphoric acid, (1-methylethylidene)di-4,1-phenylene tetraphenyl ester). In some embodiments, the triaryl phosphate is halogen free. In other embodiments, the triaryl phosphate comprises one or more halogen substituents.

The composition comprises the triaryl phosphate in an amount of about 8 to about 25 weight percent, based on the total weight of the composition. Within this range, the triaryl phosphate amount may be specifically about 9 to about 20 weight percent, more specifically about 9 to about 15 weight percent, even more specifically about 10 to about 12 weight percent.

In addition to the poly(arylene ether), the hydrogenated block copolymer, and the triaryl phosphate, the composition comprises a white pigment. The white pigment contributes to the white or off-white color of the composition. Suitable white pigments include, for example, calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, modified alumina, lithopone, zeolite, hydrated halloysite, magnesium carbonate, magnesium hydroxide, and mixtures thereof. In some embodiments, the white pigment is zinc sulfide, titanium dioxide (including rutile titanium dioxide), or a mixture thereof. In some embodiments, the white pigment is titanium dioxide.

The composition comprises white pigment in an amount of about 1 to about 12 weight percent, based on the total weight of the composition. Within this range, the white pigment amount may be specifically about 2 to about 8 weight percent, more specifically about 3 to about 5 weight percent.

In addition to the poly(arylene ether), the hydrogenated block copolymer, the triaryl phosphate, and the white pigment, the composition comprises an ultraviolet radiation stabilizer. As used herein, the term "ultraviolet radiation stabilizer" includes not only compounds that directly absorb ultraviolet light (so-called UV absorbers), but also compounds that quench photochemical excited states, compounds that decompose hydroperoxide intermediates, and compounds that scavenge free radical intermediates. Suitable classes of ultraviolet radiation stabilizers include benzophenone-type UV absorbers (including 2-hydroxybenzophenones and hydroxyphenylbenzophenones), benzotriazole-type UV absorbers (including 2-(2'-hydroxyphenyl)benzotriazoles), hindered amine light stabilizers, cinnamate-type UV absorbers, oxanilide-type UV absorbers, 2-(2'-hydroxyphenyl)-1,3,5-triazine UV absorbers, benzoxazinone-type UV absorbers, cycloaliphatic epoxy compounds, phosphite compounds, and the like. Additional classes of ultraviolet radiation stabilizers are described in H. Zweifel, Ed., "Plastics Additive Handbook", 5th Edition, Cincinnati: Hanser Gardner Publications, Inc. (2001), pages 206-238.

Benzophenone-type UV absorbers include those having the structure

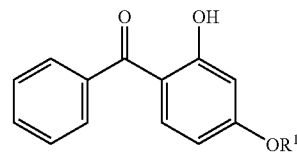

wherein $R^1$ is hydrogen or $C_1$-$C_{12}$ alkyl.

Benzotriazole-type UV absorbers include those having the structure

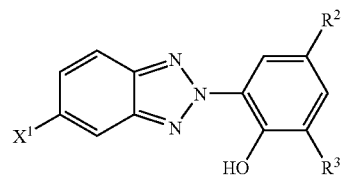

wherein $X^1$ is hydrogen or chloro; $R^2$ is $C_1$-$C_{12}$ alkyl; and $R^3$ is hydrogen or $C_1$-$C_{12}$ alkyl. A specific illustrative benzotriazole-type UV absorber is 2-(2'-hydroxy-5'-tert-octylphenyl) benzotriazole, CAS Reg. No. 3147-75-9.

Hindered amine light stabilizers generally comprise a 5- or 6-membered ring comprising a nitrogen atom bonded to two quaternary carbons. For example, suitable hindered amine light stabilizers include those having the structure

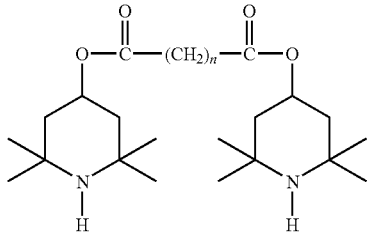

wherein n is 2 to 12, and specifically wherein n is 8. In some embodiments, the hindered amine light stabilizer is bis(2,2,6,6-tetramethyl-4-piperidinyl)sebacate, CAS Reg. No. 52829-07-9.

Cinnamate-type UV absorbers include those having the structure

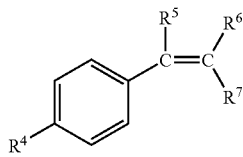

wherein $R^4$ is hydrogen or vinyl or $C_1$-$C_6$ alkoxy (specifically methoxy); $R^5$ is hydrogen or $C_1$-$C_{12}$ hydrocarbyl, specifically methyl or phenyl; and $R^6$ and $R^7$ are each independently hydrogen, cyano, (—CN) or carboxy($C_1$-$C_{12}$)alkyl.

Oxanilide-type UV absorbers include those having the structure

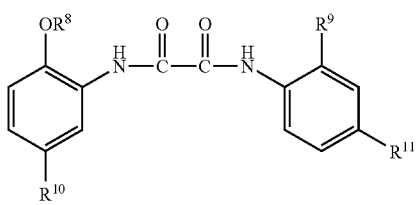

wherein $R^8$ and $R^9$ are each independently $C_1$-$C_6$ alkyl; and $R^{10}$ and $R^{11}$ are each independently hydrogen or $C_1$-$C_{12}$ alkyl, specifically tert-butyl.

2-(2'-Hydroxyphenyl)-1,3,5-triazine UV absorbers include those having the structure

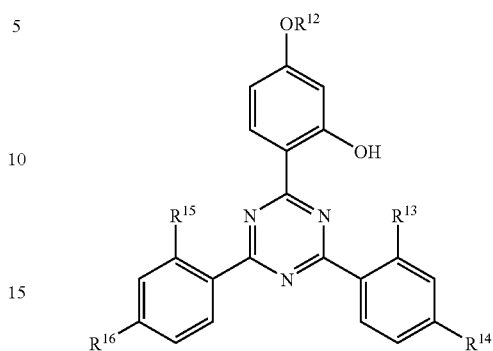

wherein $R^{12}$ is $C_1$-$C_{12}$ alkyl; and $R^{13}$, $R^{14}$, $R^{15}$, and $R^{16}$ are each independently hydrogen or $C_1$-$C_6$ alkyl (specifically methyl) or $C_6$-$C_{12}$ aryl (specifically phenyl).

Benzoxazinone-type UV absorbers include those having the structure

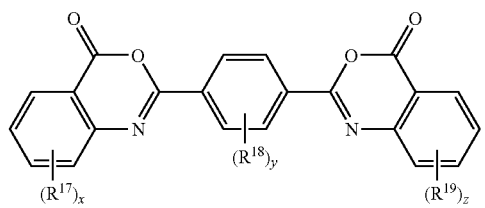

wherein $R^{17}$, $R^{18}$, and $R^{19}$ are independently at each occurrence $C_1$-$C_{12}$ alkyl or $C_1$-$C_{12}$ alkoxy; and x, y, and z are each independently 0, 1, or 2.

Cycloaliphatic epoxy compounds include, for example, cyclopentene oxide, cyclohexene oxide, 4-vinylcyclohexene oxide, 4-vinylcyclohexene dioxide, 3,4-epoxycyclohexylmethyl 3',4'-epoxycyclohexylcarboxylate (CAS Reg. No. 2386-87-0), 4-alkoxymethylcyclohexene oxides, acyloxymethylcyclohexene oxides, 1,3-bis(2-(3,4-epoxycyclohexyl) ethyl)-1,1,3,3-tetramethydisiloxane, 2-epoxy-1,2,3,4-tetrahydronaphthalene, and the like.

Mixtures of two or more UV stabilizers may be used. In some embodiments, the ultraviolet radiation stabilizer comprises a benzotriazole and a hindered amine light stabilizer. In some embodiments, the ultraviolet radiation stabilizer further comprises a cycloaliphatic epoxy compound.

The total amount of ultraviolet radiation stabilizer is about 0.1 to about 5 weight percent, based on the total composition. Within this range, the total ultraviolet radiation stabilizer amount may be specifically about 0.2 to about 3 weight percent, or about 0.5 to about 2 weight percent.

The composition may, optionally, further comprise a blue pigment.

The composition may, optionally, further comprise an optically brightener. Suitable optical brighteners are known in the art and include, for example, the optical brightener available as UVITEX OB from Ciba, and the optical brightener available as EASTOBRITE OB-1 from Eastman Chemical Company.

The composition may, optionally, further comprise a polybutene. As used herein, the term polybutene refers to a polymer comprising greater than 75 weight percent of units, specifically greater than 80 weight percent of units, derived from 1-butene, 2-butene, 2-methylpropene (isobutene), or a combination thereof. The polybutene may be a homopolymer or a copolymer. In some embodiments, the polybutene consists of units derived from 1-butene, 2-butene, 2-methylpropene (isobutene), or a combination thereof. In other embodiments, the polybutene is a copolymer that comprises 1 to less than 25 weight percent of a copolymerizable monomer such as ethylene, propylene, or 1-octene. In some embodiments, the polybutene has a number average molecular weight of about 700 to about 1,000 atomic mass units. Suitable polybutenes include, for example, the isobutene-butene copolymer having a number average molecular weight of about 800 atomic mass units obtained from Innovene as Indopol H50.

The composition may further comprise a copolymer of ethylene and a $C_3$-$C_{12}$ alpha-olefin. For brevity, this component is sometimes referred to herein as an ethylene/alpha-olefin copolymer. The ethylene/alpha-olefin copolymer is defined herein as a copolymer comprising 25 to 95 weight percent, specifically 60 to 85 weight percent, of units derived from ethylene and 75 to 5 weight percent, specifically 40 to 15 weight percent, of units derived from a $C_3$-$C_{12}$ alpha-olefin. In some embodiments, the ethylene/alpha-olefin copolymer is a random copolymer such as, for example, ethylene-propylene rubber ("EPR"), linear low density polyethylene ("LLDPE"), or very low density polyethylene ("VLDPE"). In other embodiments, the ethylene/alpha-olefin copolymer is a block copolymer comprising at least one block consisting of ethylene homopolymer or propylene homopolymer and one block that is a random copolymer of ethylene and a $C_3$-$C_{12}$ alpha-olefin. Suitable alpha-olefins include propene, 1-butene, and 1-octene. In some embodiments, the ethylene/alpha-olefin copolymer has a melt flow index of about 0.1 to about 20 grams per 10 minutes measured at 200° C. and 2.16 kilograms force. In some embodiments, the ethylene/alpha-olefin copolymer has a density of about 0.8 to about 0.9 grams per milliliter. In some embodiments, the ethylene/alpha-olefin copolymer is an ethylene-propylene rubber. In some embodiments, the ethylene/alpha-olefin copolymer is provided in the form of a melt-kneaded blend comprising hydrogenated block copolymer, ethylene/alpha-olefin copolymer, and mineral oil.

In embodiments in which the composition is substantially free of polyethylene homopolymers and polypropylene homopolymers, the ethylene/alpha-olefin copolymer is an optional component and, when present, may be used in an amount of about 0.5 to about 6 weight percent, based on the total weight of the composition. Within this range, the ethylene/alpha-olefin copolymer amount may be specifically 1 to about 4 weight percent, more specifically about 1.5 to about 3 weight percent. In some embodiments, the composition comprises 0 to less than 1 weight percent of an ethylene/alpha-olefin copolymer. In some embodiments, the composition excludes ethylene/alpha-olefin copolymer.

In embodiments in which the ethylene/alpha-olefin copolymer is a required component, it may be used in an amount of about 10 to about 55 weight percent, based on the total weight of the composition. Within this range, the amount of the ethylene/alpha-olefin copolymer may be about 15 to about 50 weight percent, specifically about 20 to about 45 weight percent, more specifically about 25 to about 40 weight percent.

The composition comprises less than or equal to 20 weight percent of rubber-modified polystyrene, based on the total weight of the composition. It has been observed that incorporation of rubber-modified polystyrene in amounts greater than 20 weight percent is associated with reduced UV stability. In some embodiments, the composition comprises rubber-modified polystyrene in an amount less than or equal to 15 weight percent, specifically less than or equal to 10 weight percent, more specifically less than or equal to 5 weight percent, even more specifically less than or equal to 1 weight percent, yet more specifically less than or equal to 0.1 weight percent. In some embodiments, the composition is substantially free of rubber-modified polystyrene. In this context, "substantially free" means that no rubber-modified polystyrene is intentionally added to the composition.

In some embodiments, the composition is substantially free of polyethylene homopolymer and polypropylene homopolymer. The term "polyethylene homopolymer" means a homopolymer of ethylene. The term "polypropylene homopolymer" means a homopolymer of propylene. In this context, "substantially free" means that no polyethylene homopolymer or polypropylene homopolymer is intentionally added to the composition. In some embodiments, the composition comprises less than 1 weight percent of polyethylene homopolymer, polypropylene homopolymer, or a mixture thereof. In some embodiments, the composition comprises less than 0.5 weight percent, or less than 0.1 weight percent, or none at all of these homopolymers. Polyethylene homopolymers include high density polyethylenes and low density polyethylenes (but not linear low density polyethylenes, which are copolymers). Polyethylene homopolymers and polypropylene homopolymers as defined herein are non-elastomeric materials.

In other embodiments, particularly those embodiments that require the presence of the ethylene/alpha-olefin copolymer, the composition may optionally comprise polyethylene homopolymer, polypropylene homopolymer, or a mixture thereof. In these embodiments, the total amount of polyethylene, polypropylene, or mixture thereof is 1 to about 30 weight percent. Within this range, the amount may be specifically about 3 to about 20 weight percent, more specifically about 5 to about 15 weight percent. In some embodiments, the composition excludes polyethylene homopolymers and polypropylene homopolymers.

The composition may, optionally, comprise mineral oil. The mineral oil can be provided in the form of a melt-kneaded blend comprising hydrogenated block copolymer, ethylene/alpha-olefin copolymer, and mineral oil. When present, mineral oil may be used in an amount of about 2 to about 20 weight percent, based on the total weight of the composition. Specifically, the mineral oil amount may be about 4 to about 15 weight percent, more specifically about 7 to about 12 weight percent.

In addition to the triaryl phosphate described above in the context of plasticizers, the composition may, optionally, comprise one or more additional flame retardants. Suitable flame retardants include, for example, magnesium hydroxide, melamine phosphate, melamine pyrophosphate, melamine polyphosphate, and combinations thereof. As demonstrated in the working examples below, excellent flame retardancy has been demonstrated in compositions comprising (a) a triaryl phosphate, (b) magnesium hydroxide, and (c) melamine pyrophosphate, melamine polyphosphate, or a mixture thereof. In some embodiments, the composition comprises a flame retardant comprising magnesium hydroxide and melamine polyphosphate, and the composition exhibits a UL94 rating of V-0 or V-1 at a thickness of 3.2 millimeters. For uses in which halogenated flame retardants can be tolerated, suitable flame retardants further include halogenated polyolefin waxes, octabromodiphenyloxide, 1,2-bis(tribromophenoxy)ethane, brominated epoxy oligomer, brominated polystyrene, chlorendic anhydride, poly(pentabromobenzyl acrylate), tetrabromobisphenol A, tetrabromobisphenol A bis (2,3-dibromopropyl ether), and the like.

The composition may, optionally, further comprise one or more other additives known in the thermoplastics arts. Useful additives include, for example, stabilizers, mold release agents, processing aids, drip retardants, nucleating agents, dyes, pigments, antioxidants, anti-static agents, blowing agents, metal deactivators, antiblocking agents, nanoclays, fragrances (including fragrance-encapsulated polymers), and the like, and combinations thereof. Additives can be added in amounts that do not unacceptably detract from the desired appearance and physical properties of the composition. Such amounts can be determined by a skilled artisan without undue experimentation.

In some embodiments, the composition can exclude or be substantially free of components other than those described above. For example, the composition can be substantially free of other polymeric materials, such as homopolystyrenes (including syndiotactic polystyrenes), polyamides, polyesters, polycarbonates, and polypropylene-graft-polystyrenes. In this context, the term "substantially free" means that none of the specified component is intentionally added.

As the composition is defined as comprising multiple components, it will be understood that each component is chemically distinct, particularly in the instance that a single chemical compound may satisfy the definition of more than one component.

In some embodiments, the composition comprises a dispersed phase comprising the poly(arylene ether), and a continuous phase comprising the hydrogenated block copolymer. Those skilled in the thermoplastic arts can determine whether a particular composition comprises such dispersed and continuous phases, for example by using electron microscopy and selective stains known in the art, including osmium tetroxide and ruthenium tetroxide. In some embodiments, the composition comprises a dispersed phase having a particle size of about 0.2 to about 20 micrometers.

One embodiment is a composition, comprising: about 18 to about 30 weight percent of a poly(2,6-dimethyl-1,4-phenylene ether); about 23 to about 35 weight percent of a polystyrene-poly(ethylene-butylene)-polystyrene triblock copolymer; about 4 to about 10 weight percent of a polybutene; about 0.5 to about 3 weight percent of an ethylene-propylene rubber; about 3 to about 10 weight percent of mineral oil; about 8 to about 16 weight percent of bisphenol A bis(diphenyl phosphate); about 2 to about 10 weight percent of magnesium hydroxide; about 4 to about 16 weight percent of melamine polyphosphate; about 2 to about 6 weight percent of titanium dioxide; about 0.1 to about 0.6 weight percent of a cycloaliphatic epoxy resin; about 0.3 to about 1 weight percent of a hydroxyphenyl benzotriazole; and about 0.6 to about 1.5 weight percent of a bis(piperidinyl)sebacate; wherein the composition is substantially free of rubber-modified polystyrene, polyethylene homopolymer, and polypropylene homopolymer; wherein all weight percents are based on the total weight of the composition; and wherein the composition exhibits a CIE lightness value, L*, value of about 80 to about 90, a CIE a* value of about −1.5 to about 0.5, a CIE b* value of about −2.5 to about 1.5, a CIELAB color shift, ΔE, of about 0.1 to about 2, measured according to ASTM D2244 after 300 hours exposure to xenon arc exposure according to ASTM D4459, and a flexural modulus of about 50 to about 100 megapascals, measured at 23° C. according to ASTM D790. In some embodiments, the composition exhibits an L* value up to about 88. In some embodiments, the composition exhibits a color shift, ΔE, of about 0.1 to about 2, measured according to ASTM D2244 after 500 hours exposure to xenon arc exposure according to ASTM D4459. In some embodiments, the composition exhibits a color shift, ΔE, of about 0.1 to about 2, measured according to ASTM D2244 after 1,000 hours exposure to xenon arc exposure according to ASTM D4459.

One embodiment is a composition, comprising: about 25 to about 45 weight percent of a poly(2,6-dimethyl-1,4-phenylene ether); about 20 to about 35 weight percent of a polystyrene-poly(ethylene-butylene)-polystyrene triblock copolymer; about 10 to about 30 weight percent of a linear low density polyethylene; about 2 to about 10 weight percent of a polybutene; about 8 to about 25 weight percent of bisphenol A bis(diphenyl phosphate), resorcinol bis(diphenyl phosphate), or a mixture thereof; about 4 to about 10 weight percent of magnesium hydroxide; about 4 to about 11 weight percent of melamine polyphosphate; about 2 to about 6 weight percent of titanium dioxide; about 0.1 to about 0.6 weight percent of a cycloaliphatic epoxy resin; about 0.3 to about 0.7 weight percent of a hydroxyphenyl benzotriazole; and about 0.6 to about 1.5 weight percent of a bis(piperidinyl) sebacate; wherein all weight percents are based on the total weight of the composition; and wherein the composition exhibits a CIE lightness value, L*, value of about 80 to about 90, a CIE a* value of about −1.5 to about 0.5, a CIE b* value of about −2.5 to about 1.5, a CIELAB color shift, ΔE, of about 0.1 to about 2, measured according to ASTM D2244 after 300 hours exposure to xenon arc exposure according to ASTM D4459, and a flexural modulus of about 50 to about 100 megapascals, measured at 23° C. according to ASTM D790.

The composition is light-colored in appearance. Specifically, the composition exhibits a CIE lightness value, L*, value of at least 70 measured according to ASTM D2244-05. In some embodiments, the lightness value, L*, may be at least 80. In some embodiments, the lightness value, L*, may be 70 to about 95, specifically about 75 to about 90, more specifically about 80 to about 90, still more specifically about 85 to about 88.

The composition is very stable to ultraviolet light. Specifically, the composition exhibits a CIE color shift, ΔE, less than or equal to 3 measured according to ASTM D2244-05 after 300 hours exposure to xenon arc exposure according to ASTM D4459-06. In some embodiments, the color shift, ΔE, is less than or equal to 3 after 500 or 1000 hours exposure to xenon arc. In some embodiments, the color shift, ΔE, is less than or equal to 2 or less than or equal to 1 after 300 or 500 or 1000 hours exposure to xenon arc.

The composition is flexible. One objective correlate of the subject term "flexibility" is flexural modulus. Thus, in some embodiments the composition exhibits a flexural modulus less than or equal to 300 megapascals, measured at 23° C. according to ASTM D790-03. In some embodiments, the flexural modulus is about 20 to about 300 megapascals, specifically about 20 to about 200 megapascals, more specifically about 35 to about 150 megapascals, even more specifically about 50 to about 100 megapascals. Values of flexural modulus may be measured according to ASTM D 790-03, Method A, on samples having dimensions 1.27 centimeters (0.5 inch) by 12.7 centimeters (5 inches) by 3.175 millimeters (0.125 inch), using a support span length of 5.08 centimeters (2 inches) and a rate of crosshead motion of 1.27 millimeters/minute (0.05 inch/minute). Another objective correlate of flexibility is tensile elongation. Thus, in some embodiments the composition exhibits a tensile elongation at break greater than or equal to 100 percent. In some embodiments, the tensile elongation is specifically about 100 to about 300 percent, more specifically about 150 to about 300 percent, even more specifically about 200 to about 300 percent, still more specifically about 250 to about 290 percent. Tensile elongation at break may be measured at 23° C. according to ASTM D 638-03 using Type I bars having a thickness of 3.2 millimeters, five bars per composition, and a testing speed of 5.08 centimeters/minute (2 inches/minute).

The invention includes methods of preparing the above-described compositions. Thus, one embodiment is a method of preparing a thermoplastic composition, comprising: melt kneading about 10 to about 45 weight percent of a poly (arylene ether), about 9 to about 80 weight percent of a hydrogenated block copolymer of an alkenyl aromatic compound and a conjugated diene, about 8 to about 25 weight percent of a plasticizer, about 1 to about 12 weight percent of a white pigment, and about 0.1 to about 5 weight percent of an ultraviolet radiation stabilizer; wherein the hydrogenated block copolymer and the poly(arylene ether) are present in a weight ratio of about 0.3 to about 4; wherein the composition comprises less than or equal to 20 weight percent of rubber-modified polystyrene; wherein the composition is substantially free of polyethylene homopolymer and polypropylene homopolymer; wherein all weight percents are based on the total weight of the composition; and wherein the composition exhibits a CIE lightness value, L*, value of at least 70 measured according to ASTM D2244, and a CIE color shift, ΔE, less than or equal to 3 measured according to ASTM D2244 after 300 hours exposure to xenon arc exposure according to ASTM D4459.

Another embodiment is a method of preparing a thermoplastic composition, comprising: melt kneading about 18 to about 30 weight percent of a poly(2,6-dimethyl-1,4-phenylene ether), about 23 to about 35 weight percent of a polystyrene-poly(ethylene-butylene)-polystyrene triblock copolymer, about 4 to about 10 weight percent of a polybutene, about 0.5 to about 3 weight percent of an ethylene-propylene rubber, about 3 to about 10 weight percent of mineral oil, about 8 to about 16 weight percent of bisphenol A bis(diphenyl phosphate), about 2 to about 10 weight percent of magnesium hydroxide, about 4 to about 16 weight percent of melamine polyphosphate, about 2 to about 6 weight percent of titanium dioxide, about 0.1 to about 0.6 weight percent of a cycloaliphatic epoxy resin, about 0.3 to about 1 weight percent of a hydroxyphenyl benzotriazole, and about 0.6 to about 1.5 weight percent of a bis(piperidinyl)sebacate; wherein the composition is substantially free of rubber-modified polystyrene, polyethylene homopolymer, and polypropylene homopolymer; wherein all weight percents are based on the total weight of the composition; and wherein the composition exhibits a CIE lightness value, L*, value of about 80 to about 90, a CIE a* value of about −1.5 to about 0.5, a CIE b* value of about −2.5 to about 1.5, a CIELAB color shift, ΔE, of about 0.1 to about 2, measured according to ASTM D2244 after 300 hours exposure to xenon arc exposure according to ASTM D4459, and a flexural modulus of about 50 to about 100 megapascals, measured at 23° C. according to ASTM D790.

Another embodiment is a method of preparing a thermoplastic composition, comprising: melt kneading about 10 to about 45 weight percent of a poly(arylene ether), about 5 to about 40 weight percent of a hydrogenated block copolymer of an alkenyl aromatic compound and a conjugated diene, about 10 to about 55 weight percent of a copolymer of ethylene and a $C_3$-$C_{12}$ alpha-olefin, about 8 to about 25 weight percent of a plasticizer, about 1 to about 12 weight percent of a white pigment, and about 0.1 to about 5 weight percent of an ultraviolet radiation stabilizer; wherein the composition comprises less than or equal to 20 weight percent of rubber-modified polystyrene; wherein all weight percents are based on the total weight of the composition; and wherein the composition exhibits a CIE lightness value, L*, value of at least 70 measured according to ASTM D2244, and a CIE color shift, ΔE, less than or equal to 3 measured according to ASTM D2244 after 300 hours exposure to xenon arc exposure according to ASTM D4459.

Another embodiment is a method of preparing a thermoplastic composition, comprising: melt kneading about 25 to about 45 weight percent of a poly(2,6-dimethyl-1,4-phenylene ether), about 20 to about 35 weight percent of a polystyrene-poly(ethylene-butylene)-polystyrene triblock copolymer, about 10 to about 30 weight percent of a linear low density polyethylene, about 2 to about 10 weight percent of a polybutene, about 8 to about 25 weight percent of bisphenol A bis(diphenyl phosphate) or resorcinol bis(diphenyl phosphate) or a mixture thereof, about 4 to about 10 weight percent of magnesium hydroxide, about 4 to about 11 weight percent of melamine polyphosphate, about 2 to about 6 weight percent of titanium dioxide, about 0.1 to about 0.6 weight percent of a cycloaliphatic epoxy resin, about 0.3 to about 0.7 weight percent of a hydroxyphenyl benzotriazole, and about 0.6 to about 1.5 weight percent of a bis(piperidinyl) sebacate; wherein all weight percents are based on the total weight of the composition; and wherein the composition exhibits a CIE lightness value, L*, value of about 80 to about 90, a CIE a* value of about −1.5 to about 0.5, a CIE b* value of about −2.5 to about 1.5, a CIELAB color shift, ΔE, of about 0.1 to about 2, measured according to ASTM D2244 after 300 hours exposure to xenon arc exposure according to ASTM D4459, and a flexural modulus of about 50 to about 100 megapascals, measured at 23° C. according to ASTM D790.

The melt temperature of the composition during melt kneading should be high enough to facilitate mixing, but low enough to avoid yellowing of the composition. In some embodiments, the melt temperature should be less than or equal to 300° C., specifically less than or equal to 270° C. The extruded material produced by melt kneading may, optionally, be cooled in a water bath prior to pelletizing using known apparatus such as a conventional pelletizer, a die-face pelletizer, or an under-water pelletizer. In some embodiments, melt kneading is conducted in an extruder, and the plasticizer is added to the extruder separately from the other components. In other embodiments, the plasticizer is pre-blended with the poly(arylene ether), and the hydrogenated block copolymer is added to the extruder at a point downstream of addition of the poly(arylene ether)/plasticizer pre-blend. In some embodiments, the poly(arylene ether), the plasticizer, and the ultraviolet radiation stabilizer are pre blended with each other before the resulting pre-blend is melt kneaded with other components. In some embodiments, the pre-blending of poly (arylene ether)/plasticizer or pre-blending of poly(arylene ether), the plasticizer, and the ultraviolet radiation stabilizer is conducted at room temperature. In some embodiments, the pre-blending of poly(arylene ether)/plasticizer or pre-blending of poly(arylene ether), the plasticizer, and the ultraviolet radiation stabilizer is conducted at temperature of from room temperature to about glass transition temperature of poly (arylene ether).

The invention includes articles, especially cable insulation, comprising any of the above-described compositions.

The invention includes methods of insulating an electrical wire with any of the above-described compositions. As used herein an electrical wire is a wire comprising a conductor capable of transmitting a detectable electric signal. Thus, one embodiment is a method of insulating an electrical wire, comprising: extrusion coating an electrical wire with a composition comprising about 10 to about 45 weight percent of a poly(arylene ether), about 9 to about 80 weight percent of a hydrogenated block copolymer of an alkenyl aromatic compound and a conjugated diene, about 8 to about 25 weight percent of a plasticizer, about 1 to about 12 weight percent of a white pigment, and about 0.1 to about 5 weight percent of an ultraviolet radiation stabilizer; wherein the hydrogenated block copolymer and the poly(arylene ether) are present in a weight ratio of about 0.3 to about 4; wherein the composition comprises less than or equal to 20 weight percent of rubber-modified polystyrene; wherein the composition is substantially free of polyethylene homopolymer and polypropylene homopolymer; wherein all weight percents are based on the total weight of the composition; and wherein the composition exhibits a CIE lightness value, L*, value of at least 70 measured according to ASTM D2244, and a CIELAB color shift, ΔE, less than or equal to 3 measured according to ASTM D2244 after 300 hours exposure to xenon arc exposure according to ASTM D4459.

Another embodiment is a method of insulating an electrical wire, comprising: extrusion coating an electrical wire with a composition comprising about 18 to about 26 weight percent of a poly(2,6-dimethyl-1,4-phenylene ether), about 23 to about 35 weight percent of a polystyrene-poly(ethylene-butylene)-polystyrene triblock copolymer, about 4 to about 10 weight percent of a polybutene, about 1 to about 3 weight percent of an ethylene-propylene rubber, about 6 to about 10 weight percent of mineral oil, about 13 to about 16 weight percent of bisphenol A bis(diphenyl phosphate), about 2 to about 10 weight percent of magnesium hydroxide, about 4 to about 11 weight percent of melamine polyphosphate, about 2 to about 6 weight percent of titanium dioxide, about 0.1 to about 0.6 weight percent of a cycloaliphatic epoxy resin, about 0.3 to about 1 weight percent of a hydroxyphenyl benzotriazole, and about 0.6 to about 1.5 weight percent of a bis(piperidinyl)sebacate; wherein the composition is substantially free of rubber-modified polystyrene, polyethylene homopolymer, and polypropylene homopolymer; wherein all weight percents are based on the total weight of the composition; and wherein the composition exhibits a CIE lightness value, L*, value of about 80 to about 90, a CIE a* value of about −1.5 to about 0.5, a CIE b* value of about −2.5 to about 1.5, a CIELAB color shift, ΔE, of about 0.1 to about 2, measured according to ASTM D2244 after 300 hours exposure to xenon arc exposure according to ASTM D4459, and a flexural modulus of about 50 to about 100 megapascals, measured at 23° C. according to ASTM D790.

Another embodiment is a method of insulating an electrical wire, comprising: extrusion coating an electrical wire with a composition comprising about 10 to about 45 weight percent of a poly(arylene ether), about 5 to about 40 weight percent of a hydrogenated block copolymer of an alkenyl aromatic compound and a conjugated diene, about 10 to about 55 weight percent of a copolymer of ethylene and a $C_3$-$C_{12}$ alpha-olefin, about 8 to about 25 weight percent of a plasticizer, about 1 to about 12 weight percent of a white pigment, and about 0.1 to about 5 weight percent of an ultraviolet radiation stabilizer; wherein the composition comprises less than or equal to 20 weight percent of rubber-modified polystyrene; wherein all weight percents are based on the total weight of the composition; and wherein the composition exhibits a CIE lightness value, L*, value of at least 70 measured according to ASTM D2244, and a CIE color shift, ΔE, less than or equal to 3 measured according to ASTM D2244 after 300 hours exposure to xenon arc exposure according to ASTM D4459.

Another embodiment is a method of insulating an electrical wire, comprising: extrusion coating an electrical wire with a composition comprising about 25 to about 45 weight percent of a poly(2,6-dimethyl-1,4-phenylene ether), about 20 to about 35 weight percent of a polystyrene-poly(ethylene-butylene)-polystyrene triblock copolymer, about 10 to about 30 weight percent of a linear low density polyethylene, about 2 to about 10 weight percent of a polybutene, about 8 to about 25 weight percent of bisphenol A bis(diphenyl phosphate) or resorcinol bis(diphenyl phosphate) or a mixture thereof, about 4 to about 10 weight percent of magnesium hydroxide, about 4 to about 11 weight percent of melamine polyphosphate, about 2 to about 6 weight percent of titanium dioxide, about 0.1 to about 0.6 weight percent of a cycloaliphatic epoxy resin, about 0.3 to about 0.7 weight percent of a hydroxyphenyl benzotriazole, and about 0.6 to about 1.5 weight percent of a bis(piperidinyl)sebacate; wherein all weight percents are based on the total weight of the composition; and wherein the composition exhibits a CIE lightness value, L*, value of about 80 to about 90, a CIE a* value of about −1.5 to about 0.5, a CIE b* value of about −2.5 to about 1.5, a CIELAB color shift, ΔE, of about 0.1 to about 2, measured according to ASTM D2244 after 300 hours exposure to xenon arc exposure according to ASTM D4459, and a flexural modulus of about 50 to about 100 megapascals, measured at 23° C. according to ASTM D790.

The invention is further illustrated by the following non-limiting examples.

EXAMPLES 1-11, COMPARATIVE EXAMPLE 1

The following examples illustrate the excellent color stability displayed by blends comprising a poly(arylene ether), a hydrogenated block copolymer, a triaryl phosphate, a white pigment, and a ultraviolet radiation stabilizer.

Table 1 lists the components in the base composition that was used to prepare Examples 1-12. The base composition includes all the components except the UV stabilizers. All component amounts are expressed in parts by weight. The poly(arylene ether) was a poly(2,6-dimethyl-1,4-phenylene ether), CAS Reg. No. 24938-67-8, having an intrinsic viscosity of 0.46 deciliters per gram, measured in chloroform at 25° C., and obtained as PPO 646 from GE Plastics ("0.46 IV PPE" in Table 1). The triaryl phosphate was bisphenol A bis(diphenyl phosphate), CAS Reg. No. 5945-33-5, obtained from Great Lakes Chemical Corporation ("BPADP" in Table 1). The hydrogenated block copolymer was a linear triblock polystyrene-poly(ethylene-butylene)-polystyrene copolymer, CAS Reg. No. 66070-58-4, having a polystyrene content of 39% and a number average molecular weight of about 160,000 atomic mass units, obtained from Kraton Polymers LLC as Kraton RP6936 ("SEBS-K6936" in Table 1). Also contributing to the total hydrogenated block copolymer was a melt-kneaded blend comprising about 40 weight percent polystyrene-poly(ethylene-butylene)-polystyrene, about 10 weight percent ethylene-propylene rubber, and about 50 weight percent mineral oil, obtained as TPE-SB2400 from Sumitomo Chemical ("SEBS/EPR/MO" in Table 1). A liquid polybutene, specifically an isobutene-butene copolymer, having a number average molecular weight of about 800 AMU, was obtained as Indopol H50 from Innovene ("Polybutene" in Table 1). Melamine polyphosphate, CAS Reg. No. 218768-84-4, obtained from Ciba Specialty Chemicals as Melapur 200/70 ("Melamine polyphosphate" in Table 1). Magnesium hydroxide, CAS Reg. No. 1309-32-8, was obtained from Kyowa Chemical Industry Co. as Kisuma 5A ("Mg(OH)$_2$" in Table 1). Erucamide, CAS Reg. No. 112-84-5, was obtained from Crompton Corporation as Kemamide E Ultra ("Erucamide" in Table 1). A hindered phenolic antioxidant, 1,2-bis (3,5-di-tert-butyl-4-hydroxyhydrocinnamoyl)hydrazine, CAS Reg. No. 32687-78-8, was obtained as Irganox MD 1024 from Ciba Specialty Chemicals ("Phen. AO-1024" in Table 1). A hindered phenolic antioxidant, octadecyl 3-(3',5'-di-tert-butyl-4'-hydroxyphenyl)propionate, CAS Reg. No. 2082-79-3, was obtained from Ciba Specialty Chemicals as Irganox 1076 ("Phen. AO-1076" in Table 1). Zinc sulfide, CAS Reg. No. 1314-98-3, was obtained from Sachtleben as Sachtolith HD ("ZnS" in Table 1). In Table 1, "MgO" refers to magnesium oxide, CAS Reg. No. 1309-48-4. A polyethylene-encapsulated fragrance was obtained from International Flavors and Fragrances as IFI-7191 PBD ("Fragrance" in Table 1). Titanium dioxide having an average particle size of 0.2 micrometers was obtained from DuPont as Ti-Pure R103-15 ("TiO$_2$" in Table 1). Carbon black having an iodine absorption of 231 grams per kilogram determined according to ASTM D1510-02a was obtained from Cabot as Monarch 800 ("Carbon" in Table 1). Pigment green 36 was obtained from BASF ("Green36" in Table 1). Ultramarine blue was obtained from Holliday Pigments ("UM blue" in Table 1). The yellow colorant Pigment brown 24 was obtained from BASF ("Yellow" in Table 1). The cycloaliphatic epoxy compound 3,4-epoxycyclohexylmethyl 3',4'-epoxycyclohexylcarboxylate, CAS Reg. No. 2386-87-0, was obtained as ERL-4221 from Dow ("Epoxy" in Table 1). The benzotriazole UV stabilizer 2-(2'-hydroxy-5'-tert-octylphenyl)-benzotriazole, CAS Reg. No. 3147-75-9, was obtained as Cyasorb UV 5411 from Cytec ("BTZ-1" in Table 1). The hindered amine light stabilizer bis(2,2,6,6-tetramethyl-4-piperidinyl)sebacate, CAS Reg. No. 52829-07-9, was obtained as Tinuvin 770 from Ciba Specialty Chemicals ("HALS" in Table 1).

Each composition was prepared as follows. All components were dry blended for 1 minute in a high speed Henschel mixer prior to extrusion. The resulting dry blend was added to the feed throat of the extruder, extruded at about 250-285° C. and cut into pellets. The extrusion temperature is preferably about 265-275° C. When the melt temperature is greater than 285 C, the color of extruding pellets may be changed. The extruder was a Werner and Pfleiderer 30-millimeter co-rotating 10-barrel twin-screw extruder with a length of 960 millimeters and a 32:1 length-to-diameter ratio. The water bath has a length of about 2 meters. The water bath temperature is controlled to less than or equal to 15° C. The pelletizer is a Conair Jetro, made by Jetro Division. For some much softer UV stable materials, the water bath temperature is controlled below 10° C. and the pelletizer is a customized sidecut rubber chopper made by Lab Tech Eng. Corp Ltd. Use of this pelletizer males the sizes of pellets more uniform. Plastic color chips of 5.08 centimeters×7.62 centimeters×0.254 centimeter (2 inches×3 inches×0.100 inch) dimensions were molded from the pellets at 215-240° C., with a molding pressure of approximately 5.5 megapascals (800 pounds per square inch) and a tool temperature of 77° C.

The UV stability of the compositions was tested according to ASTM D4459-99, "Standard Practice for Xenon-Arc Exposure of Plastics Intended for Indoor Applications". Specifically, the procedure used an exposure device obtained from Atlas as Ci4000, having a 3500 watt lamp, a radiant exposure of 0.3 watts per square-meter (W/m$^2$), and the ability to control the temperature at 55° C. and 55 percent relative humidity.

Color differences were measured according to ASTM D2244-05, "Standard Practice for Calculation of Color Tolerances and Color Differences from Instrumentally Measured Color Coordinates". Color difference ($\Delta E$) values were calculated according to the CIELAB color difference formula as follows:

$$\Delta E = [(\Delta L^*)^2 + (\Delta a^*)^2 + (\Delta b^*)^2]^{1/2}$$

wherein $$\Delta L^* = L_1^* - L_2^*$$

$$\Delta a^* = a_1^* - a_2^*$$

$$\Delta b^* = b_1^* - b_2^*$$

and wherein $L_1^*$, $a_1^*$, and $b_1^*$ are the lightness, red-green coordinate, and yellow-blue coordinate, respectively, prior to the exposure to the test, and $L_2^*$, $a2^*$, and $b_2^*$ are lightness, red-green coordinate, and yellow-blue coordinate, respectively, after exposure to the test.

Tensile elongation at break was measured at 23° C. according to ASTM D638-03 at a temperature of 23° C. and a pull rate of 50 millimeters per minute using Type I bars having a thickness of 3.2 millimeters molded using a barrel temperature of 210-235° C. and a mold temperature of 40-70° C. The tensile bars were conditioned at 23° C. and 50% relative humidity for 48 hours prior to testing. Reported values represent the average of three samples per composition.

Table 1 lists tensile elongation values as well as $\Delta E$ values as a function of exposure time for Examples 1-12, which consists of the base composition of Table 1, with the specified amounts (in parts by weight) of the three UV stabilizer compounds. The composition rows labeled "PPE/SEBS", "BPADP/PPE", and "(BTZ+HALS)/PPE" represent weight/weight ratios of the respective components (and "SEBS" in "PPE/SEBS" includes SEBS from both "SEBS-K6936" and "SEBS/EPR/MO").

TABLE 1

|  | C. Ex. 1 | Ex. 1 | Ex. 2 | Ex. 3 | Ex. 4 | Ex. 5 |
|---|---|---|---|---|---|---|
|  | Compositions | | | | | |
| 0.46 IV PPE | 22.62 | 22.62 | 22.62 | 22.62 | 22.62 | 22.62 |
| BPADP | 15.74 | 15.74 | 15.74 | 15.74 | 15.74 | 15.74 |
| SEBS-K6936 | 23.61 | 23.61 | 23.61 | 23.61 | 23.61 | 23.61 |
| SEBS/EPR/MO | 18.69 | 18.69 | 18.69 | 18.69 | 18.69 | 18.69 |
| Polybutene | 8.85 | 8.85 | 8.85 | 8.85 | 8.85 | 8.85 |
| Melamine Polyphosphate | 4.92 | 4.92 | 4.92 | 4.92 | 4.92 | 4.92 |
| Mg(OH)$_2$ | 3.93 | 3.93 | 3.93 | 3.93 | 3.93 | 3.93 |
| Erucamide | 0.20 | 0.20 | 0.20 | 0.20 | 0.20 | 0.20 |
| Phen. AO-1024 | 0.10 | 0.10 | 0.10 | 0.10 | 0.10 | 0.10 |
| Phen. AO-1076 | 0.96 | 0.96 | 0.96 | 0.96 | 0.96 | 0.96 |
| ZnS | 0.15 | 0.15 | 0.15 | 0.15 | 0.15 | 0.15 |
| MgO | 0.15 | 0.15 | 0.15 | 0.15 | 0.15 | 0.15 |

TABLE 1-continued

|  | | | | | | |
|---|---|---|---|---|---|---|
| Fragrance | 0.06 | 0.06 | 0.06 | 0.06 | 0.06 | 0.06 |
| $TiO_2$ | 3.60 | 3.60 | 3.60 | 3.60 | 3.60 | 3.60 |
| Carbon | 0.002 | 0.002 | 0.002 | 0.002 | 0.002 | 0.002 |
| Green36 | 0.00002 | 0.00002 | 0.00002 | 0.00002 | 0.00002 | 0.00002 |
| UM blue | 0.026 | 0.026 | 0.026 | 0.026 | 0.026 | 0.026 |
| Yellow | 0.0002 | 0.0002 | 0.0002 | 0.0002 | 0.0002 | 0.0002 |
| Epoxy | 0 | 1.00 | 1.00 | 1.00 | 2.00 | 2.00 |
| BTZ-1 | 0 | 3.00 | 1.00 | 3.00 | 5.00 | 2.00 |
| HALS | 0 | 1.00 | 3.00 | 3.00 | 2.00 | 5.00 |
| PPE/SEBS | 0.73 | 0.73 | 0.73 | 0.73 | 0.73 | 0.73 |
| BPADP/PPE | 0.69 | 0.69 | 0.69 | 0.69 | 0.69 | 0.69 |
| (BTZ + HALS)/PPE | 0 | 0.18 | 0.18 | 0.23 | 0.31 | 0.31 |
| Properties | | | | | | |
| ΔE at 100 h | 0.50 | 1.12 | 1.10 | 1.21 | 1.19 | 0.97 |
| ΔE at 200 h | 0.41 | 1.01 | 0.87 | 1.06 | 1.09 | 0.85 |
| ΔE at 300 h | 0.99 | 0.99 | 0.78 | 1.07 | 1.10 | 0.77 |
| ΔE at 400 h | 3.13 | 0.64 | 0.40 | 0.65 | 0.74 | 0.60 |
| ΔE at 500 h | 3.30 | 0.53 | 0.47 | 0.65 | 0.71 | 0.75 |
| ΔE at 600 h | 3.77 | 0.47 | 0.58 | 0.62 | 0.67 | 0.85 |
| ΔE at 700 h | 5.03 | 0.38 | 0.74 | 0.63 | 0.60 | 1.03 |
| ΔE at 800 h | 5.44 | 0.46 | 0.78 | 0.66 | 0.65 | 1.01 |
| ΔE at 900 h | 6.88 | 0.42 | 1.00 | 0.74 | 0.63 | 1.18 |
| ΔE at 1000 h | 7.7 | 0.51 | 1.18 | 0.82 | 0.64 | 1.31 |
| Tensile elongation at break (%) | 206 | 199 | 289 | 292 | 239 | 222 |

|  | Ex. 6 | Ex. 7 | Ex. 8 | Ex. 9 | Ex. 10 | Ex. 11 |
|---|---|---|---|---|---|---|
| Compositions | | | | | | |
| 0.46 IV PPE | 22.62 | 22.62 | 22.62 | 22.62 | 22.62 | 22.62 |
| BPADP | 15.74 | 15.74 | 15.74 | 15.74 | 15.74 | 15.74 |
| SEBS-K6936 | 23.61 | 23.61 | 23.61 | 23.61 | 23.61 | 23.61 |
| SEBS/EPR/MO | 18.69 | 18.69 | 18.69 | 18.69 | 18.69 | 18.69 |
| Polybutene | 8.85 | 8.85 | 8.85 | 8.85 | 8.85 | 8.85 |
| Melamine Polyphosphate | 4.92 | 4.92 | 4.92 | 4.92 | 4.92 | 4.92 |
| $Mg(OH)_2$ | 3.93 | 3.93 | 3.93 | 3.93 | 3.93 | 3.93 |
| Erucamide | 0.20 | 0.20 | 0.20 | 0.20 | 0.20 | 0.20 |
| Phen. AO-1024 | 0.10 | 0.10 | 0.10 | 0.10 | 0.10 | 0.10 |
| Phen. AO-1076 | 0.96 | 0.96 | 0.96 | 0.96 | 0.96 | 0.96 |
| ZnS | 0.15 | 0.15 | 0.15 | 0.15 | 0.15 | 0.15 |
| MgO | 0.15 | 0.15 | 0.15 | 0.15 | 0.15 | 0.15 |
| Fragrance | 0.06 | 0.06 | 0.06 | 0.06 | 0.06 | 0.06 |
| $TiO_2$ | 3.60 | 3.60 | 3.60 | 3.60 | 3.60 | 3.60 |
| Carbon | 0.002 | 0.002 | 0.002 | 0.002 | 0.002 | 0.002 |
| Green36 | 0.00002 | 0.00002 | 0.00002 | 0.00002 | 0.00002 | 0.00002 |
| UM blue | 0.026 | 0.026 | 0.026 | 0.026 | 0.026 | 0.026 |
| Yellow | 0.0002 | 0.0002 | 0.0002 | 0.0002 | 0.0002 | 0.0002 |
| Epoxy | 2.00 | 0.33 | 0.33 | 0.20 | 0.50 | 0.20 |
| BTZ-1 | 5.00 | 0.50 | 1.25 | 0.50 | 1.25 | 3.00 |
| HALS | 5.00 | 1.00 | 1.00 | 0.50 | 0.50 | 0.50 |
| PPE/SEBS | 0.73 | 0.73 | 0.73 | 0.73 | 0.73 | 0.73 |
| BPADP/PPE | 0.69 | 0.69 | 0.69 | 0.69 | 0.69 | 0.69 |
| (BTZ + HALS)/PPE | 0.53 | 0.066 | 0.10 | 0.044 | 0.077 | 0.15 |
| Properties | | | | | | |
| ΔE at 100 h | 0.84 | 1.46 | 1.51 | 1.54 | 1.66 | 1.44 |
| ΔE at 200 h | 0.75 | 1.14 | 1.31 | 1.33 | 1.50 | 0.90 |
| ΔE at 300 h | 0.80 | 0.84 | 1.13 | 1.23 | 1.39 | 0.72 |
| ΔE at 400 h | 0.98 | 0.14 | 0.61 | 0.45 | 0.98 | 0.38 |
| ΔE at 500 h | 1.23 | 0.16 | 0.56 | 0.56 | 1.00 | 0.13 |
| ΔE at 600 h | 1.39 | 0.14 | 0.39 | 0.45 | 0.90 | 0.20 |
| ΔE at 700 h | 1.59 | 0.42 | 0.14 | 0.22 | 0.73 | 0.49 |
| ΔE at 800 h | 1.57 | 0.40 | 0.16 | 0.25 | 0.76 | 0.39 |
| ΔE at 900 h | 1.73 | 0.64 | 0.09 | 0.10 | 0.60 | 0.69 |
| ΔE at 1000 h | 1.93 | 0.75 | 0.19 | 0.16 | 0.48 | 0.78 |
| Tensile elongation at break (%) | 282 | — | — | — | — | — |

It can be seen from the ΔE values in Table 1 that the blends comprising a poly(arylene ether), a hydrogenated block copolymer, a triaryl phosphate, a white pigment, and an ultraviolet radiation stabilizer have excellent color stability as exemplified by their low ΔE values after xenon-arc exposure. Examples 1-11 comprise different UV stabilizers, and all have ΔE values less than 2 after 100, 200, and 300 hours. These examples maintain excellent color stability after 1000 hours of exposure, with ΔE values less than 3, and in some cases less than one, such as for Examples 1, 3, 4, and 7-11.

Comparative Example 1, which does not contain any of the UV stabilizers, also exhibits a ΔE value less than 2 after 100, 200, and 300 hours of exposure, but its color stability degrades substantially between 300 and 1000 hours of exposure.

The data in Table 1 also show that low color shift is achieved with a wide range of types and amounts of UV stabilizers. For example, the total of all UV stabilizing additives was about 1.2 weight percent for Example 9, which exhibited a ΔE of 0.16 after 1000 hours of exposure, whereas it was about 12.0 weight percent for Example 6, which exhibited a ΔE of 1.93 after 1000 hours of exposure. The robustness of the UV stability to variations in UV stabilizer amount shows that it is possible to use relatively small amounts of UV stabilizers and therefore minimize any adverse impact of UV stabilizers on mechanical properties, flame retardancy, and physical separation of the composition over time.

COMPARATIVE EXAMPLES 2-13

The following comparative examples demonstrate that blends with high-impact polystyrene (HIPS; a rubber-modified polystyrene) instead of hydrogenated block copolymer exhibit color stability markedly inferior to that demonstrated for Examples 1-11 above.

Sample compositions are listed in Table 2. The poly(arylene ether) was a poly(2,6-dimethyl-1,4-phenylene ether) having an intrinsic viscosity of 0.31 dL/g, measured in chloroform at 25° C., obtained as PPO 630 from GE Plastics ("0.31 IV PPE" in Table 2). A high impact polystyrene comprising 10.3 weight percent polybutadiene rubber was obtained from GE Huntsman as NORYL HIPS 3190 ("HIPS" in Table 2). A linear low density polyethylene having a melt flow index of about 20 grams per 10 minutes measured at 190° C. and 2.16 kilograms force was obtained from Nova Chemicals as Novapol GM-2024-A ("LLDPE-1" in Table 2). Tridecyl phosphate was obtained from Dover Chemical ("TDP" in Table 2). A polytetrafluoroethylene encapsulated in styrene-acrylonitrile copolymer is designated "TSAN" in Table 2. Iron oxide having less than 0.10 weight percent retained by a 325 mesh sieve was obtained from Bayer as Bayferrox 180 MPL ("Iron oxide" in Table 2). Benzoin was obtained from Aceto Chemical ("Benzoin" in Table 2). Resorcinol bis(diphenyl phosphate), CAS Reg. No. 57583-54-7, was obtained from Akzo Nobel as Fyrolflex RDP ("RDP" in Table 2). Other components are as described above. All component amounts in Table 2 are expressed in parts by weight.

Tensile strength at break and tensile elongation at break were measured according to ASTM D638-03 using the conditions described above.

Table 2 also shows ΔE values after 100-300 hours xenon arc exposure. Note that the ΔE values after 300 hours exposure range from 11.2 to 30.7 for all samples—much greater than the values for Examples 1-11 above, which were all less than 1.5.

TABLE 2

|  | C. Ex. 2 | C. Ex. 3 | C. Ex. 4 | C. Ex. 5 | C. Ex. 6 | C. Ex. 7 | C. Ex. 8 | C. Ex. 9 | C. Ex. 10 | C. Ex. 11 | C. Ex. 12 | C. Ex. 13 |
|---|---|---|---|---|---|---|---|---|---|---|---|---|
| Compositions |
| 0.31 IV PPE | 31.3 | 31.3 | 31.3 | 31.3 | 31.3 | 31.3 | 31.3 | 31.3 | 31.3 | 31.3 | 31.3 | 31.3 |
| HIPS | 35.4 | 35.4 | 35.4 | 35.4 | 35.4 | 35.4 | 35.4 | 35.4 | 35.4 | 35.4 | 35.4 | 35.4 |
| LLDPE-1 | 1.5 | 1.5 | 1.5 | 1.5 | 1.5 | 1.5 | 1.5 | 1.5 | 1.5 | 1.5 | 1.5 | 1.5 |
| TDP | 0.5 | 0.5 | 0.5 | 0.5 | 0.5 | 0.5 | 0.5 | 0.5 | 0.5 | 0.5 | 0.5 | 0.5 |
| HALS | 1.0 | 1.0 | 1.0 | 1.0 | 1.0 | 1.0 | 1.0 | 1.0 | 1.0 | 1.0 | 1.0 | 1.0 |
| BTZ-1 | 1.0 | 1.0 | 1.0 | 1.0 | 1.0 | 1.0 | 1.0 | 1.0 | 1.0 | 1.0 | 1.0 | 1.0 |
| ZnO | 0.1 | 0.1 | 0.1 | 0.1 | 0.1 | 0.1 | 0.1 | 0.1 | 0.1 | 0.1 | 0.1 | 0.1 |
| ZnS | 0.1 | 0.1 | 0.1 | 0.1 | 0.1 | 0.1 | 0.1 | 0.1 | 0.1 | 0.1 | 0.1 | 0.1 |
| TSAN | 0.2 | 0.2 | 0.2 | 0.2 | 0.2 | 0.2 | 0.2 | 0.2 | 0.2 | 0.2 | 0.2 | 0.2 |
| Carbon | 0.0 | 0.0 | 0.0 | 0.0 | 0.0 | 0.0 | 0.0 | 0.0 | 0.0 | 0.0 | 0.0 | 0.0 |
| Iron oxide | 1.0 | 1.0 | 1.0 | 1.0 | 1.0 | 1.0 | 1.0 | 1.0 | 1.0 | 1.0 | 1.0 | 1.0 |
| UM blue | 0.7 | 0.7 | 0.7 | 0.7 | 0.7 | 0.7 | 0.7 | 0.7 | 0.7 | 0.7 | 0.7 | 0.7 |
| $TiO_2$ | 11.7 | 11.7 | 11.7 | 11.7 | 11.7 | 11.7 | 11.7 | 11.7 | 11.7 | 11.7 | 5.8 | 5.8 |
| Benzoin | 0.5 | 0.5 | 0 | 0.5 | 0 | 0 | 0 | 0 | 0 | 0.5 | 0.5 | 0.5 |
| Epoxy | 1.0 | 0 | 1.0 | 0 | 1.0 | 0 | 0 | 0 | 1.0 | 0 | 1.0 | 0 |
| RDP | 19.0 | 19.0 | 19.0 | 19.0 | 19.0 | 19.0 | 19.0 | 19.0 | 19.0 | 19.0 | 19.0 | 19.0 |
| Properties |
| ΔE at 100 h | 0.7 | 0.7 | 0.7 | 1.5 | 0.7 | 1.3 | 0.9 | 1.0 | 2.0 | 1.7 | 1.5 | 2.5 |
| ΔE at 200 h | 2.1 | 3.0 | 2.4 | 5.1 | 2.2 | 4.4 | 2.9 | 2.9 | 0.8 | 1.1 | 2.1 | 1.1 |
| ΔE at 300 h | 14.5 | 11.2 | 33.5 | 30.7 | 29.8 | 29.4 | 29.6 | 30.6 | 25.9 | 26.8 | 28.9 | 27.9 |
| Tensile Strength at break (MPa) | 44.9 | 44.1 | 44.5 | 42.3 | 45.6 | 44.1 | 43.8 | — | 43.7 | 43.3 | — | 45.4 |
| Tensile Elongation at break (%) | 23 | 26 | 28 | 22 | 24 | 26 | 24 | — | 31 | 28 | — | 24 |

COMPARATIVE EXAMPLES 14-20

The following comparative examples further illustrate that blends with high-impact polystyrene (HIPS) exhibit color stability markedly inferior compared to blends with hydrogenated block copolymer.

Table 3 lists the compositions of Comparative Examples 14-20, along with their ΔE values after 300 hours. The quinophthalone dye 4,5,6,7-tetrachloro-2-[2-(4,5,6,7-tetrachloro-2,3-dihydro-1,3-dioxo-1H-inden-2-yl)-8-quinolinyl]-H-isoindole-1,3(2H)-dione (CAS Reg. No. 30125-47-4; Pigment Yellow 138) was obtained as Paliotol Yellow K 0961 HD from BASF ("CC Dye" in Table 3). The benzotriazole UV stabilizer 2-(2-hydroxy-3,5-di-cumyl)benzotriazole was obtained as Tinuvin 324 from Ciba Specialty Chemicals ("BTZ-2" in Table 3). "Total UV stabilizer" is the sum of the amounts of BTZ-1, BTZ-2, HALS 770, and Epoxy.

Table 3 also lists various CIE color properties of the samples. Initial values of L*, a*, and b* were determined on color chips as-molded according to ASTM D2244-05, "Standard Practice for Calculation of Color Tolerances and Color Differences from Instrumentally Measured Color Coordinates". Changes in b* and ΔE after 300 hours of xenon arc exposure were determined according to the same standard.

exposure indicates that yellowing of the sample is the major component of the total color shift.

COMPARATIVE EXAMPLE 21

This example illustrates that color stability begins to suffer when the triaryl phosphate concentration is less than 8 weight percent.

Compositions are detailed in Table 4.

The composition and ΔE values as a function of xenon arc exposure time are presented in Table 4. For this sample, the magnesium hydroxide was obtained as Magshield UF from Martin Marietta Magnesia Specialties. Melamine pyrophosphate was obtained as Budit 311 MPP from Budenheim Iberica Comercial S.A. ("Melamine pyrophosphate" in Table 4). Other components are as described above.

The data show that the ΔE value rises to 5.81 after 300 hours of xenon arc exposure.

TABLE 3

|  | C. Ex. 14 | C. Ex. 15 | C. Ex. 16 | C. Ex. 17 | C. Ex. 18 | C. Ex. 19 | C. Ex. 20 |
|---|---|---|---|---|---|---|---|
| Compositions | | | | | | | |
| 0.31 IV PPE | 28.40 | 26.50 | 26.90 | 27.40 | 29.40 | 28.90 | 26.90 |
| HIPS | 41.10 | 38.30 | 39.00 | 39.70 | 42.70 | 41.90 | 39.00 |
| BPADP | 17.20 | 16.10 | 16.30 | 16.60 | 17.90 | 17.50 | 16.34 |
| LLDPE-1 | 1.40 | 1.30 | 1.30 | 1.30 | 1.40 | 1.40 | 1.29 |
| Benzoin | 0.50 | 0.40 | 0.40 | 0.40 | 0.50 | 0.50 | 0.43 |
| CC Dye | 0 | 0 | 0 | 0 | 0 | 0 | 0.04 |
| TDP | 0.50 | 0.40 | 0.40 | 0.40 | 0.50 | 0.50 | 0.43 |
| ZnO | 0.10 | 0.10 | 0.10 | 0.10 | 0.10 | 0.10 | 0.09 |
| ZnS | 0.10 | 0.10 | 0.10 | 0.10 | 0.10 | 0.10 | 0.09 |
| TSAN | 0.20 | 0.20 | 0.20 | 0.20 | 0.20 | 0.20 | 0.15 |
| Carbon | 0.02 | 0.02 | 0.02 | 0.02 | 0.02 | 0.02 | 0.02 |
| Iron oxide | 0.89 | 0.83 | 0.84 | 0.86 | 0.92 | 0.91 | 0.84 |
| UM blue | 0.66 | 0.61 | 0.62 | 0.63 | 0.68 | 0.67 | 0.62 |
| BTZ-2 | 2.70 | 0 | 2.60 | 0 | 0.90 | 0 | 0.86 |
| HALS 770 | 0.90 | 0.80 | 0.90 | 0.90 | 0.90 | 0.90 | 0.86 |
| $TiO_2$ | 3.60 | 10.10 | 10.30 | 10.50 | 3.80 | 3.70 | 10.31 |
| BTZ-1 | 0 | 2.50 | 0 | 0.90 | 0 | 2.80 | 0 |
| Epoxy | 1.80 | 1.70 | 0 | 0 | 0 | 0 | 1.72 |
| Total UV stabilizer | 5.4 | 5.1 | 3.4 | 1.7 | 1.9 | 3.7 | 3.4 |
| PPE/HIPS | 0.69 | 0.69 | 0.69 | 0.64 | 0.69 | 0.69 | 0.69 |
| Properties | | | | | | | |
| initial L* | 56.49 | 68.03 | 68.4 | 68.3 | 57.0 | 58.1 | 67.6 |
| initial a* | 4.44 | 3.31 | 3.3 | 3.3 | 4.4 | 4.3 | 3.3 |
| initial b* | −4.18 | −3.81 | −3.8 | −3.8 | −4.2 | −4.2 | −4.0 |
| Δb* at 300 h | 2.9 | 3.7 | 6.4 | 7.7 | 7.3 | 4.1 | 6.3 |
| ΔE at 300 h | 3.0 | 3.8 | 6.6 | 8.0 | 7.6 | 4.2 | 6.5 |
| Tensile strength at break (MPa) | 35.8 | 38.4 | 47.0 | 43.4 | 41.1 | 39.2 | 39.0 |
| Tensile Elongation at break (%) | 11 | 4 | 3 | 6 | 9 | 6 | 7 |

It can be seen that Comparative Examples 14-20, in which the poly(arylene ether) is blended with a rubber-modified polystyrene rather than a hydrogenated block copolymer, have very poor color stability. Specifically, these samples exhibit ΔE values ranging from 3.0 to 33.5 after 300 hours of exposure to ASTM D4459. In contrast, Examples 1-11 above, with hydrogenated block copolymer rather than rubber-modified polystyrene, exhibited ΔE values ranging from 0.72 to 1.39 after 300 hours. For Comparative Examples 14-20, the similarity of Δb* and ΔE values after 300 hours xenon arc

TABLE 4

|  | C. Ex. 21 |
|---|---|
| Composition | |
| 0.46 IV PPE | 22.01 |
| SEBS-K6936 | 22.97 |
| BPADP | 7.19 |
| SEBS/EPR/MO | 17.68 |

TABLE 4-continued

|  | C. Ex. 21 |
| --- | --- |
| Polybutene | 8.67 |
| Melamine polyphosphate | 4.90 |
| Mg(OH)$_2$ | 3.95 |
| Erucamide | 0.19 |
| Phen. AO-1024 | 0.10 |
| ZnS | 0.14 |
| MgO | 0.15 |
| Melamine pyrophosphate | 9.00 |
| Phen. AO-1076 | 0.96 |
| Fragrance | 0.20 |
| Epoxy | 0.33 |
| BTZ-1 | 0.50 |
| HALS | 1.00 |
| TiO$_2$ | 3.60 |
| Carbon | 0.002 |
| Green36 | 0.00002 |
| UM blue | 0.026 |
| Yellow | 0.0002 |
| BPADP | 7.19 |
| PPE/SEBS | 0.73 |
| ΔE after xenon arc exposure | |
| 100 h | 1.12 |
| 200 h | 3.90 |
| 300 h | 5.81 |
| 400 h | 4.79 |
| 500 h | 4.79 |
| 600 h | 4.97 |

EXAMPLES 12-17

These examples illustrate the effect of poly(arylene ether) concentration on the flexibility and UV stability of the composition.

Compositions are detailed in Table 5.

Shore A hardness was measured at 25° C. according to ASTM D 2240-05 using a Rex Model DD-3-A digital durometer with OS-2H operating stand.

Flexural modulus values, expressed in megapascals (MPa), were measured at 23° C. according to ASTM D 790-03, Method A, on samples having dimensions 1.27 centimeters (0.5 inch) by 12.7 centimeters (5 inches) by 3.175 millimeters (0.125 inch). The support span length was 5.08 centimeters (2 inches). The rate of crosshead motion was 1.27 millimeters/minute (0.05 inch/minute).

The property values in Table 5 for Examples 13-16, which vary in PPE/SEBS ratio but are otherwise essentially identical, show that tensile strength, tensile elongation, flexural modulus, and flame retardancy vary monotonically as the weight ratio of poly(arylene ether) to hydrogenated block copolymer (that is, PPE/SEBS) increases. However, the relationship between PPE/SEBS and color shift (ΔE) is more complex. Relative to Examples 15 and 16 with higher PPE/SEBS ratios, Example 13 with a PPE/SEBS ratio of 0.42 and Example 14 with a PPE/SEBS ratio of 0.68 have higher ΔE values of about 1.8 and 1.4, respectively, at 100 hours exposure, but their ΔE values then decline between 200 and 500 hours exposure. In contrast, Examples 15 and 16 both exhibit ΔE values of about 1 at 100 hours, a decrease in ΔE to about 0.2 after 200 hours, and increasing ΔE going from 300 to 400 to 500 hours. Notwithstanding the differences in ΔE versus time trends as a function of PPE/SEBS, Examples 12-17 collectively show that ΔE values less than 2 for xenon arc exposures as long as 500 hours can be achieved for PPE/SEBS ratios from 0.25 to 2.13 and poly(arylene ether) concentrations of 10 to 45 weight percent. The data from these experiments also suggest that compositions comprising 10 to 45 weight percent poly(arylene ether) can exhibit the flexibility, softness, and UV stability needed for use as a covering for electrically conductive cable and coaxial cable.

TABLE 5

|  | Ex. 12 | Ex. 13 | Ex. 14 | Ex. 15 | Ex. 16 | Ex. 17 |
| --- | --- | --- | --- | --- | --- | --- |
| Compositions | | | | | | |
| 0.46 IV PPE | 10.35 | 16.35 | 22.77 | 28.77 | 34.77 | 45.00 |
| SEBS-K6936 | 33.76 | 31.76 | 25.76 | 19.76 | 13.76 | 12.56 |
| SEBS/EPR/MO | 18.81 | 18.81 | 18.81 | 18.81 | 18.81 | 18.81 |
| Polybutene | 5.00 | 5.00 | 5.00 | 5.00 | 5.00 | 0 |
| Melamine polyphosphate | 8.95 | 4.95 | 4.95 | 4.95 | 4.95 | 4.95 |
| Mg(OH)$_2$ | 3.96 | 3.96 | 3.96 | 3.90 | 3.90 | 0.00 |
| Erucamide | 0.19 | 0.19 | 0.20 | 0.19 | 0.19 | 0.19 |
| Phen. AO-1024 | 0.09 | 0.10 | 0.10 | 0.09 | 0.09 | 0.09 |
| ZnS | 0.14 | 0.14 | 0.15 | 0.14 | 0.14 | 0.14 |
| MgO | 0.15 | 0.15 | 0.15 | 0.15 | 0.15 | 0.15 |
| Phen. AO-1076 | 0.96 | 0.96 | 0.96 | 0.96 | 0.96 | 0.96 |
| Fragrance | 0.21 | 0.21 | 0.21 | 0.21 | 0.21 | 0.21 |
| Epoxy | 0.33 | 0.33 | 0.33 | 0.33 | 0.33 | 0.33 |
| BTZ-1 | 0.50 | 0.50 | 0.50 | 0.50 | 0.50 | 0.50 |
| HALS | 1.00 | 1.00 | 1.00 | 1.00 | 1.00 | 1.00 |
| TiO$_2$ | 3.60 | 3.60 | 3.60 | 3.60 | 3.60 | 3.60 |
| Carbon | 0.0020 | 0.0020 | 0.0020 | 0.0020 | 0.0020 | 0.0020 |
| UM blue | 0.026 | 0.026 | 0.026 | 0.026 | 0.026 | 0.026 |
| Yellow | 0.00020 | 0.00020 | 0.00020 | 0.00020 | 0.00020 | 0.00020 |
| BPADP | 15.19 | 15.19 | 15.19 | 15.19 | 15.19 | 15.19 |
| PPE/SEBS Ratio | 0.25 | 0.42 | 0.68 | 1.05 | 1.63 | 2.13 |
| BPDPA/PPE | 1.47 | 0.93 | 0.67 | 0.53 | 0.44 | 0.34 |
| (BTZ + HALS)/PPE | 0.145 | 0.092 | 0.066 | 0.052 | 0.043 | 0.033 |
| Properties | | | | | | |
| L* | 86.09 | 86.72 | 86.78 | 86.88 | 86.71 | 86.67 |
| a* | −0.95 | −1.24 | −1.36 | −1.45 | −1.55 | −1.68 |

TABLE 5-continued

|  | Ex. 12 | Ex. 13 | Ex. 14 | Ex. 15 | Ex. 16 | Ex. 17 |
|---|---|---|---|---|---|---|
| b* | 1.126 | 0.997 | 1.247 | 1.354 | 1.944 | 2.987 |
| ΔE at 100 | 0.95 | 1.78 | 1.36 | 1.06 | 0.99 | 0.94 |
| ΔE at 200 | 0.23 | 1.78 | 1.18 | 0.2 | 0.24 | 0.68 |
| ΔE at 300 | 0.24 | 1.74 | 1.19 | 0.30 | 0.40 | 1.24 |
| ΔE at 400 | 0.48 | 1.72 | 0.91 | 0.82 | 0.84 | 2.30 |
| ΔE at 500 | 0.94 | 1.52 | 0.61 | 1.5 | 1.5 | 3.24 |
| Shore A | 65 | 76 | 83 | 87 | 92 | 96 |
| Flex Mod. (MPa) | 26 | 68 | 133 | 199 | 323 | 840 |
| Tensile strength at break (MPa) | 5 | 10 | 13 | 15 | 16 | 24 |
| Tensile elongation at break (%) | 252 | 200 | 189 | 135 | 73 | 27 |
| UL94 flame-out time (sec) | 32 | 33 | 16 | 4.5 | 3.0 | 2.9 |
| UL94 rating | V2 | V2 | V1 | V0 | V0 | V0 |

EXAMPLES 18-21

These examples illustrate the effects of polybutene concentration on UV stability and physical properties.

Compositions are detailed in Table 6. A polystyrene-poly(ethylene-butylene)-polystyrene triblock copolymer having a polystyrene content of 13 weight percent and a melt flow of 22 grams per 10 minutes measured at 230° C. with a 5 kilogram force was obtained from Kraton Polymers as Kraton G1657M ("SEBS-K1657M" in Table 6).

Property results are presented in Table 6. The results show that increasing levels of polybutene are generally associated with enhanced color stability (decreasing ΔE values). One might speculate that some of the UV stability improvement could be attributed to the relatively UV-inert nature of polybutene. However, the maximum polybutene concentration is about 8 weight percent of the total concentration. So, the variations in polybutene concentration are small enough that they have relatively small effects on the tensile properties and Shore A hardness and therefore would be expected to have a relatively small effect on UV stability. Instead, addition of a small amount of polybutene has a significant beneficial effect on UV stability.

TABLE 6

|  | Ex. 18 | Ex. 19 | Ex. 20 | Ex. 21 |
|---|---|---|---|---|
| Compositions | | | | |
| SEBS-K6936 | 23.0 | 24.0 | 24.0 | 24.0 |
| SEBS/EPR/MO | 18.7 | 18.7 | 18.7 | 18.7 |
| Polybutene | 8.1 | 4.1 | 2.1 | 0.0 |
| 0.46 IV PPE | 22.0 | 22.0 | 22.0 | 22.0 |
| Melamine polyphosphate | 5.0 | 8.0 | 8.0 | 8.0 |
| Mg(OH)$_2$ | 3.9 | 3.9 | 3.9 | 4.1 |
| SEBS-K1657M | 0 | 0 | 0 | 4.0 |
| Epoxy | 0.5 | 0.5 | 0.5 | 0.5 |
| BTZ-1 | 1.0 | 1.0 | 1.0 | 1.0 |
| HALS | 1.0 | 1.0 | 1.0 | 1.0 |
| TiO$_2$ | 3.60 | 3.60 | 3.60 | 3.60 |
| Carbon | 0.002 | 0.002 | 0.002 | 0.002 |
| Green36 | 0.00002 | 0.00002 | 0.00002 | 0.00002 |
| UM blue | 0.026 | 0.026 | 0.026 | 0.026 |
| Yellow | 0.0002 | 0.0002 | 0.0002 | 0.0002 |
| BPADP | 15.2 | 15.2 | 15.2 | 15.2 |
| PPE/SEBS | 0.72 | 0.70 | 0.70 | 0.70 |
| BPADP/PPE | 0.69 | 0.69 | 0.69 | 0.69 |
| (BTZ + HALS)/PPE | 0.09 | 0.09 | 0.09 | 0.09 |

TABLE 6-continued

|  | Ex. 18 | Ex. 19 | Ex. 20 | Ex. 21 |
|---|---|---|---|---|
| Properties | | | | |
| ΔE at 100 h | 1.48 | 1.79 | 1.61 | 2.16 |
| ΔE at 200 h | 1.26 | 1.59 | 1.35 | 1.87 |
| ΔE at 300 h | 0.96 | 1.37 | 1.00 | 1.50 |
| ΔE at 400 h | 0.84 | 1.33 | 0.89 | 1.40 |
| ΔE at 500 h | 0.67 | 1.15 | 0.71 | 1.25 |
| Tensile stress at break (MPa) | 11 | 10 | 14 | 13. |
| Tensile elongation at break (%) | 235 | 242 | 218 | 226 |
| Shore A hardness | 72 | 78 | 83 | 82 |

EXAMPLES 22-27

These examples illustrate the effects of variations in the SEBS/EPR/MO, polybutene, SEBS, and melamine pyrophosphate concentrations on UV stability and physical properties.

Compositions are detailed in Table 7. As noted above, SEBS/EPR/MO is a melt-kneaded blend of 40% polystyrene-poly(ethylene-butylene)-polystyrene, 10% ethylene-propylene rubber, and 50% mineral oil.

The results for Example 26, in particular its different initial color (much yellower than the desired light gray color), suggest that some error may have occurred in the formulation or compounding of this material. With the exception of Example 26, the results in Table 7 indicate that the tensile properties and UV stabilities of these formulations are robust to variations in the concentrations of SEBS/EPR/MO, polybutene, SEBS, and melamine pyrophosphate.

TABLE 7

|  | Ex. 22 | Ex. 23 | Ex. 24 | Ex. 25 | Ex. 26 | Ex. 27 |
|---|---|---|---|---|---|---|
| Compositions | | | | | | |
| 0.46 IV PPE | 21.2 | 21.2 | 20.3 | 20.9 | 20.8 | 21.3 |
| SEBS-K6936 | 23.1 | 23.1 | 22.1 | 22.7 | 21.7 | 22.1 |
| SEBS/EPR/MO | 14.2 | 10.3 | 17.2 | 17.7 | 17.7 | 20.1 |
| Polybutene | 4.0 | 3.9 | 0 | 0 | 4.0 | 0 |
| Melamine polyphosphate | 7.66 | 7.66 | 13.81 | 10.41 | 8.47 | 8.63 |
| Mg(OH)$_2$ | 3.82 | 3.82 | 5.43 | 6.53 | 5.58 | 5.69 |
| SEBS-K1657M | 3.85 | 7.71 | 0 | 0 | 0 | 0 |
| Epoxy | 0.48 | 0.48 | 0.46 | 0.47 | 0.47 | 0.48 |
| BTZ-1 | 0.96 | 0.96 | 0.92 | 0.95 | 0.95 | 0.96 |
| HALS | 0.96 | 0.96 | 0.92 | 0.95 | 0.95 | 0.96 |
| TiO$_2$ | 3.60 | 3.60 | 3.60 | 3.60 | 3.60 | 3.60 |
| Carbon | 0.002 | 0.002 | 0.002 | 0.002 | 0.002 | 0.002 |
| Green36 | 0.00002 | 0.00002 | 0.00002 | 0.00002 | 0.00002 | 0.00002 |
| UM blue | 0.026 | 0.026 | 0.026 | 0.026 | 0.026 | 0.026 |
| Yellow | 0.0002 | 0.0002 | 0.0002 | 0.0002 | 0.0002 | 0.0002 |
| BPADP | 14.63 | 14.63 | 13.98 | 14.37 | 14.37 | 14.63 |
| PPE/SEBS ratio (wt) | 0.65 | 0.61 | 0.70 | 0.70 | 0.72 | 0.71 |
| BPADP/PEE | 0.69 | 0.69 | 0.69 | 0.69 | 0.69 | 0.69 |
| (BTZ + HALS)/PPE | 0.09 | 0.09 | 0.09 | 0.09 | 0.09 | 0.09 |
| Properties | | | | | | |
| L* | 86.25 | 86.81 | 86.62 | 86.82 | 91.73 | 86.87 |
| a* | −2.09 | −2.06 | −2.04 | −2.04 | −0.59 | −2.09 |
| b* | 2.64 | 1.58 | 2.28 | 2.18 | 7.70 | 1.76 |
| Tensile stress at break (MPa) | 12.4 | 13.0 | 13.2 | 13.1 | 10.5 | 13.8 |
| Tensile elongation at break (%) | 205 | 215 | 176 | 199 | 226 | 219 |
| Flexible modulus (MPa) | 162 | 165 | 228 | 189 | 141 | 199 |
| Shore A | 82 | 88 | 82 | 87 | 87 | 79 |
| ΔE at 100 h | 2.96 | 1.70 | 1.89 | 1.90 | 3.45 | 1.76 |
| ΔE at 200 h | 2.74 | 1.43 | 1.67 | 1.67 | 3.43 | 1.48 |
| ΔE at 300 h | 2.39 | 1.10 | 1.34 | 1.35 | 3.25 | 1.11 |
| ΔE at 400 h | 2.32 | 1.00 | 1.24 | 1.24 | 3.13 | 0.95 |
| ΔE at 500 h | 2.18 | 0.84 | 1.12 | 1.07 | 3.30 | 0.91 |

EXAMPLE 28, COMPARATIVE EXAMPLES 22-26

These examples and comparative examples illustrate variation of the hydrogenated block copolymer type and partial substitution of HIPS for hydrogenated block copolymer.

Many of the examples above use Kraton A RP6936 as the hydrogenated block copolymer. It is a linear triblock polystyrene-poly(ethylene-butylene)-polystyrene copolymer having a polystyrene content of 39% and a number average molecular weight of about 160,000 atomic mass units. Example 28 uses a linear triblock polystyrene-poly(ethylene-butylene)-polystyrene copolymer having a polystyrene content of about 30%, obtained as Kraton G1650 from Kraton Polymers ("SEBS-KG1650" in Table 8). Comparative Examples 22-26 use blends of HIPS and different hydrogenated block copolymers. The following block copolymers were obtained from Kraton Polymers: Kraton G1651 ("SEBS-KG1651" in Table 8) is a linear triblock polystyrene-poly(ethylene-butylene)-polystyrene copolymer having a polystyrene content of 33%; Kraton D1101 ("SBS" in Table 8) is a linear triblock polystyrene-polybutadiene-polystyrene copolymer having a polystyrene content of 31%; Kraton G1701 ("SEP-KG1701" in Table 8) is a linear diblock polystyrene-poly(ethylene-propylene) copolymer having a polystyrene content of 37%; Kraton G1702 ("SEP-KG1701" in Table 8) is a linear diblock polystyrene-poly(ethylene-propylene) copolymer having a polystyrene content of 28%.

The benzophenone light stabilizer 2-hydroxy-4-n-octoxy-benzophenone was obtained from Cytec Corporation as Cyasorb UV-531 ("Cyasorb UV-531" in Table 8).

The results in Table 8 indicate that the UV stability advantages of the inventive composition are robust to variations in the poly(alkenyl aromatic) content of the hydrogenated block copolymer. Although it is not possible cleanly resolve the effects of HIPS addition and block copolymer type and amount, the results for Example 28 and Comparative Examples 22-26 suggest that HIPS concentrations greater than 20 percent may have a substantial adverse effect on UV stability.

TABLE 8

|  | Ex. 28 | C. Ex. 22 | C. Ex. 23 | C. Ex. 24 | C. Ex. 25 | C. Ex. 26 |
|---|---|---|---|---|---|---|
| Compositions | | | | | | |
| 0.46 IV PPE | 19.81 | 19.81 | 19.81 | 19.81 | 19.81 | 19.81 |
| Cyasorb UV-531 | 0.44 | 0.44 | 0.44 | 0.44 | 0.44 | 0.44 |
| HALS | 0.88 | 0.88 | 0.88 | 0.88 | 0.88 | 0.88 |
| Melamine polyphosphate | 4.31 | 4.31 | 4.31 | 4.31 | 4.31 | 4.31 |
| Mg(OH)$_2$ | 3.45 | 3.45 | 3.45 | 3.45 | 3.45 | 3.45 |
| Erucamide | 0.17 | 0.17 | 0.17 | 0.17 | 0.17 | 0.17 |
| Phen. AO-1024 | 0.09 | 0.09 | 0.09 | 0.09 | 0.09 | 0.09 |
| ZnS | 0.13 | 0.13 | 0.13 | 0.13 | 0.13 | 0.13 |
| MgO | 0.13 | 0.13 | 0.13 | 0.13 | 0.13 | 0.13 |
| Phen. AO-1076 | 0.43 | 0.43 | 0.43 | 0.43 | 0.43 | 0.43 |
| Epoxy | 0.29 | 0.29 | 0.29 | 0.29 | 0.29 | 0.29 |
| TiO$_2$ | 3.15 | 3.15 | 3.15 | 3.15 | 3.15 | 3.15 |
| UM blue | 0.02 | 0.02 | 0.02 | 0.02 | 0.02 | 0.02 |
| BPADP | 15.73 | 15.73 | 15.73 | 15.73 | 15.73 | 15.73 |
| SEBS-KG1650 | 50.98 | 25.49 | 0.00 | 0.00 | 0.00 | 0.00 |
| SEBS-KG1651 | 0.00 | 0.00 | 25.49 | 0.00 | 0.00 | 0.00 |
| SBS | 0.00 | 0.00 | 0.00 | 25.49 | 0.00 | 0.00 |

TABLE 8-continued

|  | Ex. 28 | C. Ex. 22 | C. Ex. 23 | C. Ex. 24 | C. Ex. 25 | C. Ex. 26 |
|---|---|---|---|---|---|---|
| SEP-KG1702 | 0.00 | 0.00 | 0.00 | 0.00 | 25.49 | 0.00 |
| SEP-KG1701 | 0.00 | 0.00 | 0.00 | 0.00 | 0.00 | 25.49 |
| HIPS | 0.00 | 25.49 | 25.49 | 25.49 | 25.49 | 25.49 |
| Properties |  |  |  |  |  |  |
| ΔE at 300 h | 1.38 | 10.04 | 12.10 | 6.14 | 11.59 | 11.85 |

EXAMPLE 29, COMPARATIVE EXAMPLES 27-29

These examples illustrate the effects of hydrogenated block copolymer versus rubber-modified polystyrene, and presence and absence of triaryl phosphate.

Compositions are detailed in Table 9.

"Resin color" in Table 9 was evaluated by visual inspection.

The results for Comparative Examples 27 and 28, which contain rubber-modified polystyrene (HIPS) but no hydrogenated block copolymer, show that the samples exhibited poor UV stability as indicated by ΔE values of 5.0 and 14.8, respectively, after 300 hours xenon arc exposure show. In addition, Comparative Example 28 was initially gray rather than the desired white. Comparative Example 5, which includes hydrogenated block copolymer but lacks a triaryl phosphate, exhibits poor UV stability. Example 26, which includes both hydrogenated block copolymer and triaryl phosphate, exhibits the desirable initial white color and excellent UV stability.

TABLE 9

|  | C. Ex. 27 | C. Ex. 28 | C. Ex. 29 | Ex. 29 |
|---|---|---|---|---|
| Compositions |  |  |  |  |
| 0.46 IV PPE | 33.19 | 28.9 | 33.19 | 27.97 |
| LLDPE-1 | 0 | 1.4 | 0 | 0 |
| Benzoin | 0 | 0.5 | 0 | 0 |
| TDP | 0 | 0.5 | 0 | 0 |
| SEBS-K6936 | 0 | 0 | 61.64 | 51.94 |
| HIPS | 61.64 | 41.9 | 0 | 0 |
| TiO$_2$ | 3.4 | 3.7 | 3.4 | 2.9 |
| Ultramarine blue | 0.0242 | 0.669 | 0.0242 | 0.0204 |
| Carbon black | 0.0019 | 0.021 | 0.0019 | 0.0016 |
| Iron oxide | 0 | 0.905 | 0 | 0 |
| BPADP | 0 | 17.5 | 0 | 16.0 |
| Epoxy | 0.31 | 0 | 0.31 | 0.31 |
| BTZ-1 | 0.47 | 0.9 | 0.47 | 0.40 |
| HALS | 0.95 | 0.9 | 0.95 | 0.79 |
| PPE/SEBS | 0 | 0 | 0.54 | 0.54 |
| PPE/HIPS | 0.54 | 0.69 | 0 | 0 |
| BPADP/PPE | 0.00 | 0.6 | 0 | 0.57 |
| (BTZ + HALS)/PPE | 0.04 | 0.06 | 0.04 | 0.042 |
| Properties |  |  |  |  |
| ΔE at 300 h | 14.8 | 15.0 | 19.8 | 0.6 |
| Resin Color | white | gray | white | white |

EXAMPLES 30-36, COMPARATIVE EXAMPLES 30-37

These examples illustrate the effects of varying concentrations of poly(arylene ether), hydrogenated block copolymer, SEBS/EPR/MO, triaryl phosphate, and polybutene, as well as the effect of hydrogenated block copolymer versus rubber-modified polystyrene in compositions lacking a triaryl phosphate.

Compositions are detailed in Table 10.

CIE lightness values, L*, and ΔE values after 300 and 500 hours of xenon arc exposure are presented in Table 10. All compositions had similar lightness values. Various comparisons illustrate the profound improvement in UV stability associated with the presence of the triaryl phosphate BPADP in compositions containing identical parts by weight of other components: Comparative Example 31 (no BPADP; ΔE@300 h=11.5, ΔE@500 h=11.9) versus Example 30 (+BPADP; ΔE@300 h=0.9, ΔE@500 h=0.6); Comparative Example 32 (no BPADP; ΔE@300 h=11.0, ΔE@500 h=11.7) versus Example 31 (+BPADP; ΔE@300 h=0.8, ΔE@500 h=0.5); Comparative Example 33 (no BPADP; ΔE@300 h=11.1, ΔE@500 h=12.0) versus Example 32 (+BPADP; ΔE@300 h=1.1, ΔE@500 h=0.6); Comparative Example 35 (no BPADP; ΔE@300 h=17.4, ΔE@500 h=17.3) versus Example 35 (+BPADP; ΔE@300 h=0.5, ΔE@500 h=1.5); Comparative Example 36 (no BPADP; ΔE@300 h=15.9, ΔE@500 h=16.7) versus Example 36 (+BPADP; ΔE@300 h=0.8, ΔE@500 h=1.6).

Comparative Example 30 and Comparative Example 31 collectively illustrate the effect of HIPS versus SEBS for compositions lacking a triaryl phosphate. It is actually the HIPS-containing sample that exhibits a lower (better) ΔE value after 300 hours, and both samples have very large ΔE values after 500 hours. This comparison further illustrates that the substantially improved UV stability of a composition comprising poly(arylene ether), hydrogenated block copolymer, and triaryl phosphate is unexpected.

The results for Examples 30-32 collectively show that the excellent UV stability of the composition is fairly robust to substituting SEBS/EPR/MO blend for about 25% of the SEBS, and substituting polybutene for about 15% of the SEBS.

TABLE 10

|  | C. Ex. 30 | C. Ex. 31 | Ex. 30 | C. Ex. 32 | Ex. 31 |
|---|---|---|---|---|---|
| Compositions |  |  |  |  |  |
| 0.46 IV PPE | 20.00 | 20.00 | 20.00 | 20.00 | 20.00 |
| HIPS | 80.00 | 0 | 0 | 0 | 0 |
| SEBS/EPR/MO | 0 | 0 | 0 | 20.00 | 20.00 |
| Polybutene | 0 | 0 | 0 | 0 | 0 |
| SEBS-K6936 | 0 | 80.00 | 80.00 | 60.00 | 60.00 |
| Epoxy | 0.33 | 0.33 | 0.33 | 0.33 | 0.33 |
| BTZ-1 | 0.50 | 0.50 | 0.50 | 0.50 | 0.50 |
| HALS | 1.00 | 1.00 | 1.00 | 1.00 | 1.00 |
| TiO$_2$ | 3.60 | 3.60 | 3.60 | 3.60 | 3.60 |
| Carbon | 0.002 | 0.002 | 0.002 | 0.002 | 0.002 |
| Green36 | 0.00002 | 0.00002 | 0.00002 | 0.00002 | 0.00002 |
| UM blue | 0.026 | 0.026 | 0.026 | 0.026 | 0.026 |
| Yellow | 0.0002 | 0.0002 | 0.0002 | 0.0002 | 0.0002 |
| BPADP | 0 | 0 | 20.00 | 0 | 20.00 |
| PPE/SEBS | — | 0.25 | 0.25 | 0.29 | 0.29 |
| PPE/HIPS | 0.25 | — | — | — | — |
| BPADP/PPE | 0 | 0 | 1 | 0 | 1 |
| (BTZ + HALS)/PPE | 0.075 | 0.075 | 0.075 | 0.075 | 0.075 |
| Properties |  |  |  |  |  |
| CIE L* value | 85.2 | 86.2 | 85.9 | 86.1 | 86.2 |
| ΔE after 300 h | 3.9 | 11.5 | 0.9 | 11.0 | 0.8 |
| ΔE after 500 h | 11.4 | 11.9 | 0.6 | 11.7 | 0.5 |

TABLE 10-continued

| | C. Ex. 33 | Ex. 32 | C. Ex. 34 | Ex. 33 | Ex. 34 |
|---|---|---|---|---|---|
| Compositions | | | | | |
| 0.46 IV PPE | 20.00 | 20.00 | 20.00 | 20.00 | 35.00 |
| HIPS | 0 | 0 | 0 | 0 | 0 |
| SEBS/EPR/MO | 0 | 0 | 20.00 | 20.00 | 0 |
| Polybutene | 10.00 | 10.00 | 10.00 | 10.00 | 0 |
| SEBS-K6936 | 70.00 | 70.00 | 50.00 | 50.00 | 65.00 |
| Epoxy | 0.33 | 0.33 | 0.33 | 0.33 | 0.33 |
| BTZ-1 | 0.50 | 0.50 | 0.50 | 0.50 | 0.50 |
| HALS | 1.00 | 1.00 | 1.00 | 1.00 | 1.00 |
| $TiO_2$ | 3.60 | 3.60 | 3.60 | 3.60 | 3.60 |
| Carbon | 0.002 | 0.002 | 0.002 | 0.002 | 0.002 |
| Green36 | 0.00002 | 0.00002 | 0.00002 | 0.00002 | 0.00002 |
| UM blue | 0.026 | 0.026 | 0.026 | 0.026 | 0.026 |
| Yellow | 0.0002 | 0.0002 | 0.0002 | 0.0002 | 0.0002 |
| BPADP | 0 | 20.00 | 0 | 20.00 | 20.00 |
| PPE/SEBS | 0.29 | 0.29 | 0.34 | 0.34 | 0.54 |
| PPE/HIPS | — | — | — | — | — |
| BPADP/SEBS | 0 | 1 | 0 | 1 | 1 |
| (BTZ + HALS)/PPE | 0.075 | 0.075 | 0.075 | 0.075 | 0.043 |
| Properties | | | | | |
| CIE L* value | 86.4 | 86.0 | 86.3 | — | 85.8 |
| ΔE after 300 h | 11.1 | 1.1 | 10.9 | — | 0.6 |
| ΔE after 500 h | 12.0 | 0.6 | 11.9 | — | 1.2 |

| | C. Ex. 35 | Ex. 35 | C. Ex. 36 | Ex. 36 | C. Ex. 37 |
|---|---|---|---|---|---|
| Compositions | | | | | |
| 0.46 IV PPE | 35.00 | 35.00 | 35.00 | 35.00 | 35.00 |
| HIPS | 0 | 0 | 0 | 0 | 0 |
| SEBS/EPR/MO | 20.00 | 20.00 | 20.00 | 20.00 | 0 |
| Polybutene | 0 | 0 | 10.00 | 10.00 | 10.00 |
| SEBS-K6936 | 45.00 | 45.00 | 35.00 | 35.00 | 55.00 |
| Epoxy | 0.33 | 0.33 | 0.33 | 0.33 | 0.33 |
| BTZ-1 | 0.50 | 0.50 | 0.50 | 0.50 | 0.50 |
| HALS | 1.00 | 1.00 | 1.00 | 1.00 | 1.00 |
| $TiO_2$ | 3.60 | 3.60 | 3.60 | 3.60 | 3.60 |
| Carbon | 0.002 | 0.002 | 0.002 | 0.002 | 0.002 |
| Green36 | 0.00002 | 0.00002 | 0.00002 | 0.00002 | 0.00002 |
| UM blue | 0.026 | 0.026 | 0.026 | 0.026 | 0.026 |
| Yellow | 0.0002 | 0.0002 | 0.0002 | 0.0002 | 0.0002 |
| BPADP | 0.00 | 20.00 | 0 | 20.00 | 0 |
| PPE/SEBS | 0.66 | 0.66 | 0.81 | 0.81 | 0.64 |
| PPE/HIPS | — | — | — | — | — |
| BPADP/PPE | 0 | 0.57 | 0 | 0.57 | 0 |
| (BTZ + HALS)/PPE | 0.042 | 0.042 | 0.042 | 0.042 | 0.042 |
| Properties | | | | | |
| CIE L* value | 85.9 | 86.1 | 86.1 | 86.3 | 86.1 |
| ΔE after 300 h | 17.4 | 0.5 | 15.9 | 0.8 | 17.2 |
| ΔE after 500 h | 17.3 | 1.5 | 16.7 | 1.6 | 17.7 |

EXAMPLES 37, 38, 38A, AND 38B

These examples further illustrate the excellent UV stability, and physical, electrical, and flame-retardant properties of the compositions. Compositions are detailed in Table 11.

Relative permittivity was measured according to ASTM D150-98(2004), "Standard Test Methods for AC Loss Characteristics and Permittivity (Dielectric Constant) of Solid Electrical Insulation". The sample shape was a tensile testing bar having a 3 millimeters thickness. The surface of the sample must be flat so as to make good contact with the test fixture electrodes on both sides of the sample. The sample was dried at 85° C. for 2 hours. After drying, the sample was conditioned at room temperature of 23° C. and 50 percent relative humidity for 24 hours before testing. The measurement circuit was an Agilent 4291B RF Impedance/Materials Analyzer made by Hewlett Packard, and the typical frequencies used were 60 hertz, 1 megahertz, and 100 megahertz.

The flame retardancy of test articles was determined according to Underwriter's Laboratory UL 94, "Test for Flammability of Plastic Materials for Parts in Devices and Appliances", 5th Edition (1996). Specifically, the Vertical Burning Flame Test was used. In this procedure, a test bar with dimensions 125×12.5×3.2 millimeters is mounted vertically. A 1.9 centimeter (three-quarter inch) flame is applied to the end of the test bar for 10 seconds and removed. The time to extinguish is measured (first burn time). The flame is reapplied for another 10 seconds and removed. The time to extinguish is measured (second burn time). For a V-0 rating, no individual burn times from the first or second flame application may exceed 10 seconds; the total of the burn times for any five specimens may not exceed 50 seconds; and drip particles that ignite a piece of cotton gauze situated below the specimen are not allowed; burn-to-clamps is not allowed. For a V-1 rating, no individual burn times from the first or second flame application may exceed 30 seconds; the total of the burn times for any five specimens may not exceed 250 seconds; and drip particles that ignite a piece of cotton gauze situated below the specimen are not allowed. For a V-2 rating, no individual burn times from the first or second flame application may exceed 30 seconds; the total of the burn times for any five specimens may not exceed 250 seconds; and drip particles that ignite a piece of cotton gauze situated below the specimen are allowed, but burn-to-clamps is not allowed.

The property results in Table 11 show that these formulations exhibit excellent UV stability and also have physical, electric, and flame-retardant properties that make them suitable for use as a covering for conductive cables. The compositions are particularly suitable for use as a covering for cables used with solid state audio and audio/video players such as Ipods.

TABLE 11

| | Ex. 37 | Ex. 38 | Ex. 38A | Ex. 38B |
|---|---|---|---|---|
| Compositions | | | | |
| 0.46 IV PPE | 22.01 | 24.00 | 25.50 | 27.00 |
| SEBS K6936 | 22.97 | 23.00 | 22.50 | 19.00 |
| SEBS/EPR/MO | 18.68 | 14.50 | 14.00 | 8.00 |
| Polybutene | 8.67 | 6.50 | 5.50 | 8.00 |
| SEBS K1657 | 0.00 | 0.00 | 0.00 | 8.00 |
| Melamine polyphosphate | 4.95 | 10.00 | 13.50 | 11.00 |
| $Mg(OH)_2$ | 3.96 | 7.00 | 6.12 | 6.00 |
| Erucamide | 0.19 | 0.80 | 0.40 | 0.40 |
| Phen. AO-1024 | 0.10 | 0.10 | 0.10 | 0.10 |
| ZnS | 0.14 | 0.15 | 0.15 | 0.15 |
| MgO | 0.15 | 0.15 | 0.15 | 0.15 |
| Phen. AO-1076 | 0.96 | 0.96 | 0.90 | 0.90 |
| Fragrance | 0.20 | 0.12 | 0.10 | 0.12 |
| Epoxy | 0.33 | 0.33 | 0.33 | 0.33 |
| BTZ-1 | 0.50 | 0.50 | 0.75 | 0.75 |
| HALS | 1.00 | 1.00 | 1.00 | 1.00 |

TABLE 11-continued

| | Ex. 37 | Ex. 38 | Ex. 38A | Ex. 38B |
|---|---|---|---|---|
| TiO$_2$ | 3.5991 | 3.5991 | 3.5991 | 3.5991 |
| Carbon | 0.0020 | 0.0020 | 0.0020 | 0.0020 |
| UM blue | 0.00002 | 0.0640 | 0.02560 | 0.02560 |
| Yellow | 0.02560 | 0.0002 | 0.0002 | 0.0002 |
| Iron oxide | 0.00020 | 0.03 | 0.00 | 0.00 |
| BPADP | 15.19 | 11.00 | 9.00 | 9.10 |
| Properties | | | | |
| ΔB at 300 h | 0.8 | 2.3 | — | — |
| Shore A hardness | 80 | 80 | 84 | 84 |
| Tensile strength at break (MPa) | 13 | 13.4 | 15 | 15 |
| Tensile elongation at break (%) | 200 | 191 | 84 | 79 |
| Flexural modulus (MPa) | 80 | 65 | 178 | 169 |
| UL 94 V-0 3.2 mm | V-1 | V-1 | V-0 | V-0 |
| Relative Permittivity at 60 Hz | 2.9 | 2.9 | — | — |

EXAMPLES 39-41, COMPARATIVE EXAMPLES 38-40

These examples further illustrates that the UV stabilization advantages of the invention extend to compositions comprising polyolefin.

A linear low density polyethylene having a density of 0.924 grams per milliliter, a melting point of 123° C., and a melt index of 20 grams per 10 minutes measured at 190° C. and 2.16 kilograms force according ASTM D1238 was obtained as DNDA-7144 NT 7 from Dow. The linear low density polyethylene is designated "LLDPE-2" in Table 12. All other components are described above.

The results in Table 12 show that excellent UV stability was exhibited by Examples 39-41 with poly(arylene ether), hydrogenated block copolymer, triaryl phosphate, polyolefin, and ultraviolet radiation stabilizer (evidenced by values of ΔE at 300 hours less than or equal to 1.43). Corresponding Comparative Examples 38-40 lacking an ultraviolet radiation stabilizer exhibited much worse UV stability (evidenced by values of ΔE at 300 hours greater than or equal to 4.69).

TABLE 12

| | Ex. 39 | C. Ex. 38 | Ex. 40 | C. Ex. 39 |
|---|---|---|---|---|
| Compositions | | | | |
| 0.46 IV PPE | 31.09 | 31.09 | 28.87 | 28.87 |
| SEBS-K1657M | 22.86 | 22.86 | 21.65 | 21.65 |
| LLDPE-2 | 14.63 | 14.63 | 14.43 | 14.43 |
| Polybutene | 0 | 0 | 2.71 | 2.71 |
| Melamine polyphosphate | 4.57 | 4.57 | 5.41 | 5.41 |
| Mg(OH)$_2$ | 5.49 | 5.49 | 5.41 | 5.41 |
| Erucamide | 0.00 | 0.00 | 0.45 | 0.45 |
| Phen. AO-1024 | 0.10 | 0.10 | 0.09 | 0.09 |
| ZnS | 0.14 | 0.14 | 0.14 | 0.14 |
| MgO | 0.14 | 0.14 | 0.14 | 0.14 |
| Phen. AO-1076 | 0.91 | 0.91 | 0.90 | 0.90 |
| Fragrance | 0.11 | 0.11 | 0.11 | 0.11 |
| Epoxy | 0.33 | 0 | 0.33 | 0 |
| BTZ-1 | 0.5 | 0 | 0.5 | 0 |
| HALS | 1.0 | 0 | 1.0 | 0 |
| TiO$_2$ | 3.60 | 3.60 | 3.60 | 3.60 |
| Carbon | 0.002 | 0.002 | 0.002 | 0.002 |
| Green36 | 0.00002 | 0.00002 | 0.00002 | 0.00002 |
| UM blue | 0.026 | 0.026 | 0.026 | 0.026 |
| Yellow | 0.0002 | 0.0002 | 0.0002 | 0.0002 |
| RDP | 18.29 | 18.29 | 18.04 | 18.04 |

TABLE 12-continued

| | | | | |
|---|---|---|---|---|
| Properties | | | | |
| ΔE at 300 h | 1.19 | 9.47 | 1.43 | 4.69 |
| Shore A | 91 | 90 | 89 | 89 |
| Tensile strength at @ break (MPa) | 11 | 12.5 | 10.0 | 10.2 |
| TE (%) | 54 | 63 | 62 | 67 |
| Flex Modulus (MPa) | 314 | 314 | 271 | 252 |

| | Ex. 41 | C. Ex. 40 |
|---|---|---|
| Compositions | | |
| 0.46 IV PPE | 30.61 | 30.61 |
| SEBS-K1657M | 25.36 | 25.36 |
| LLDPE-2 | 12.92 | 12.92 |
| Polybutene | 1.91 | 1.91 |
| Melamine polyphosphate | 5.26 | 5.26 |
| Mg(OH)$_2$ | 5.26 | 5.26 |
| Erucamide | 0.19 | 0.19 |
| Phen. AO-1024 | 0.10 | 0.10 |
| ZnS | 0.14 | 0.14 |
| MgO | 0.14 | 0.14 |
| Phen. AO-1076 | 0.96 | 0.96 |
| Fragrance | 0.11 | 0.11 |
| Epoxy | 0.33 | 0 |
| BTZ-1 | 0.5 | 0 |
| HALS | 1.0 | 0 |
| TiO$_2$ | 3.60 | 3.60 |
| Carbon | 0.002 | 0.002 |
| Green36 | 0.00002 | 0.00002 |
| UM blue | 0.026 | 0.026 |
| Yellow | 0.0002 | 0.0002 |
| RDP | 18.29 | 18.29 |
| Properties | | |
| ΔE at 300 h | 0.69 | 6.65 |
| Shore A | 88 | 88 |
| Tensile strength at @ break (MPa) | 10.1 | 11.3 |
| TE (%) | 86 | 90 |
| Flex Modulus (MPa) | 216 | 191 |

EXAMPLE 42, COMPARATIVE EXAMPLE 41

These examples illustrate that the UV stability advantages of the invention extend to compositions comprising an ethylene/alpha-olefin copolymer.

An ethylene-octene copolymer having a density at 23° C. of 0.882 gram per milliliter measured according to ISO 1183, a melting point of 70° C. measured by differential scanning calorimetry according to ASTM D3418, and a melt flow rate of 1.1 decigrams per minute measured at 190° C. and 2.16 kilogram force according to ISO 1133 was obtained as Exact 8201 from DEXPLASTOMERS ("PEO" in Table 13). Butylated triphenyl phosphate was obtained from Supresta ("BTPP" in Table 13). All other component are described above.

The results in Table 13 show that Example 42, containing poly(arylene ether), hydrogenated block copolymer, ethylene-octene copolymer, triaryl phosphate, and ultraviolet radiation stabilizer exhibited excellent UV stability, whereas Comparative Example 41, which lacked the ultraviolet radiation stabilizer, exhibited very poor UV stability.

TABLE 13

|  | Ex. 42 | C. Ex. 41 |
|---|---|---|
| Compositions | | |
| 0.46 IV PPE | 27.34 | 28.00 |
| SEBS-KG1650 | 9.76 | 10.00 |
| PEO | 48.82 | 50.00 |
| BTPP | 11.72 | 12.00 |
| Phen. AO-1024 | 0.10 | 0.10 |
| ZnS | 0.14 | 0.14 |
| MgO | 0.15 | 0.15 |
| Fragrance | 0.20 | 0.20 |
| Epoxy | 0.33 | 0 |
| BTZ-1 | 0.50 | 0 |
| HALS | 1.00 | 0 |
| TiO$_2$ | 3.59910 | 3.59910 |
| Carbon | 0.00200 | 0.00200 |
| UM Blue | 0.02560 | 0.02560 |
| Yellow | 0.00020 | 0.00020 |
| Properties | | |
| Tensile strength at break (MPa) | 13.8 | 12.8 |
| Tensile elongation at break (%) | 123 | 123 |
| Shore A | 88 | 87 |
| Flame out time (sec) | 120 | 120 |
| ΔE at 100 h | 1.28 | 0.96 |
| ΔE at 200 h | 0.94 | 5.85 |
| ΔE at 300 h | 0.30 | 15.62 |
| ΔE at 400 h | 0.45 | 21.69 |
| ΔE at 500 h | 1.14 | 24.04 |

EXAMPLES 43-48

These examples illustrate the effects of variations in the flame retardant type and amount. In Examples 43 and 44, the flame retardant is a combination of melamine polyphosphate and bisphenol A bis(diphenyl phosphate); the two samples differ slightly in the amount of bisphenol A bis(diphenyl phosphate). Examples 43 and 44 also contain a linear low density polyethylene obtained as NUCG5381 from Nagase ("LLDPE-3" in Table 14). Examples 45-48 lack linear low density polyethylene. In Examples 45 and 46, the flame retardant is a combination of melamine polyphosphate, melamine pyrophosphate, and bisphenol A bis(diphenyl phosphate). In Examples 47 and 48, the flame retardant is a combination of melamine polyphosphate, melamine pyrophosphate, and resorcinol bis(diphenyl phosphate).

The results in Table 14 show that all samples exhibit excellent UV stability. The results also show that Examples 43 and 44, which contain linear low density polyethylene and the flame retardant combination of melamine polyphosphate and bisphenol A bis(diphenyl phosphate), achieved the highly desirable UL94 V-0 rating. Also, the results show that Examples 45-48, which lack linear low density polyethylene, exhibited relatively low Shore A hardness values, as required for some cable covering applications. Also, the results show that BPADP is better than RDP for UV stability.

TABLE 14

|  | Ex. 43 | Ex. 44 | Ex. 45 | Ex. 46 |
|---|---|---|---|---|
| Compositions | | | | |
| 0.46 IV PPE | 27.01 | 27.01 | 27.01 | 27.01 |
| SEBS-K6936 | 20.26 | 20.26 | 20.26 | 20.26 |
| SEBS/EPR/MO | 10.00 | 10.00 | 15.00 | 15.00 |
| LLDPE-3 | 5.00 | 5.00 | 0 | 0 |
| Polybutene | 4.00 | 4.00 | 6.00 | 6.00 |
| Melamine polyphosphate | 6.00 | 6.00 | 4.82 | 4.82 |
| Mg(OH)$_2$ | 5.00 | 5.00 | 5.00 | 5.00 |
| Erucamide | 0.48 | 0.48 | 0.48 | 0.48 |
| Phen. AO-1024 | 0.10 | 0.10 | 0.10 | 0.10 |
| ZnS | 0.14 | 0.14 | 0.14 | 0.14 |
| MgO | 0.14 | 0.14 | 0.14 | 0.14 |
| Melamine pyrophosphate | 0 | 0 | 7.72 | 7.72 |
| BTPP | 6.00 | 6.00 | 0 | 0 |
| Phen. AO-1076 | 0.96 | 0.96 | 0.96 | 0.96 |
| Fragrance | 0.12 | 0.12 | 0.12 | 0.12 |
| Epoxy | 0.33 | 0.33 | 0.33 | 0.33 |
| BTZ-1 | 0.50 | 0.50 | 0.50 | 0.50 |
| HALS | 1.00 | 1.00 | 1.00 | 1.00 |
| TiO$_2$ | 3.59910 | 3.59910 | 3.59910 | 3.59910 |
| Carbon | 0.00200 | 0.00200 | 0.00200 | 0.00200 |
| UM Blue | 0.02560 | 0.02560 | 0.02560 | 0.02560 |
| Yellow | 0.00020 | 0.00020 | 0.00020 | 0.00020 |
| BPADP | 9.00 | 10.00 | 9.00 | 10.00 |
| RDP | 0 | 0 | 0 | 0 |
| Properties | | | | |
| ΔE at 100 h | 1.82 | 1.78 | 0.7 | 0.84 |
| ΔE at 200 h | 1.42 | 1.32 | 1.57 | 1.08 |
| ΔE at 300 h | 1.36 | 1.23 | 1.87 | 1.4 |
| Flexural modulus (MPa) | 286 | 304 | — | — |
| Tensile strength at break (MPa) | 15 | 151 | 14 | 14 |
| Tensile elongation at break (%) | 150 | 140 | 146 | 148 |
| Shore A | 92 | 91 | 84 | 84 |
| UL 94 rating | V-0 | V-0 | V-1 | V-1 |
| UL94 flame-out time (sec) | 2.6 | 3.1 | 7.3 | 4.9 |

|  | Ex. 47 | Ex. 48 |
|---|---|---|
| Compositions | | |
| 0.46 IV PPE | 27.01 | 27.01 |
| SEBS-K6936 | 20.26 | 20.26 |
| SEBS/EPR/MO | 16.40 | 15.00 |
| LLDPE-3 | 0 | 0 |
| Polybutene | 6.00 | 6.00 |
| Melamine polyphosphate | 4.82 | 5.00 |
| Mg(OH)$_2$ | 4.82 | 5.00 |
| Erucamide | 0.48 | 0.48 |
| Phen. AO-1024 | 0.10 | 0.10 |
| ZnS | 0.14 | 0.14 |
| MgO | 0.14 | 0.14 |
| Melamine pyrophosphate | 7.72 | 7.72 |
| BTPP | 0 | 0 |
| Phen. AO-1076 | 0.96 | 0.96 |
| Fragrance | 0.12 | 0.12 |
| Epoxy | 0.33 | 0.33 |
| BTZ-1 | 0.50 | 0.50 |
| HALS | 1.00 | 1.00 |
| TiO$_2$ | 3.59910 | 3.59910 |
| Carbon | 0.00200 | 0.00200 |
| UM Blue | 0.02560 | 0.02560 |
| Yellow | 0.00020 | 0.00020 |
| BPADP | 0 | 0 |
| RDP | 9.00 | 10.00 |
| Properties | | |
| ΔE at 100 h | 0.52 | 0.41 |
| ΔE at 200 h | 1.64 | 1.57 |
| ΔE at 300 h | 2.56 | 2.62 |
| Flexural modulus (MPa) | — | — |
| Tensile strength at break (MPa) | 14 | 13 |
| Tensile elongation at break (%) | 136 | 149 |
| Shore A | 81 | 84 |
| UL 94 rating | V-1 | V-1 |
| UL94 flame-out time (sec) | 6.4 | 6.4 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, of if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A composition, comprising:
   about 10 to about 45 weight percent of a poly(arylene ether);
   about 5 to about 40 weight percent of a hydrogenated block copolymer of an alkenyl aromatic compound and a conjugated diene;
   about 10 to about 55 weight percent of a copolymer of ethylene and a $C_3$-$C_{12}$ alpha-olefin;
   about 8 to about 25 weight percent of a plasticizer, wherein the plasticizer is bisphenol A bis(diphenyl phosphate);
   about 1 about 12 weight percent of a white pigment; and
   about 0.1 to about 5 weight percent of an ultraviolet radiation stabilizer;
   wherein the composition comprises less than or equal to 20 weight percent of rubber-modified polystyrene;
   wherein all weight percents are based on the total weight of the composition; and
   wherein the composition exhibits
      a CIE lightness value, L*, value of at least 70 measured according to ASTM D2244, and
      a CIELAB color shift, ΔE, less than or equal to 3 measured according to ASTM D2244 after 300 hours exposure to xenon arc exposure according to ASTM D4459.

2. The composition of claim 1, exhibiting a CIE lightness value, L*, value of at least 80.

3. The composition of claim 1, exhibiting a CIELAB color shift, ΔE, less than or equal to 3 measured according to ASTM D2244 after 500 hours exposure to xenon arc exposure according to ASTM D4459.

4. The composition of claim 1, exhibiting a CIELAB color shift, ΔE, less than or equal to 3 measured according to ASTM D2244 after 1000 hours exposure to xenon arc exposure according to ASTM D4459.

5. The composition of claim 1, exhibiting a flexural modulus less than or equal to 300 megapascals, measured at 23° C. according to ASTM D790.

6. The composition of claim 1, exhibiting a tensile elongation at 23° C. greater than or equal to 100 percent, measured according to ASTM D638.

7. The composition of claim 1, wherein hydrogenated block copolymer of is a polystyrene-poly(ethylene-butylene)-polystyrene triblock copolymer.

8. The composition of claim 1, wherein at least a portion of the hydrogenated block copolymer is provided in the form of a melt-kneaded blend comprising hydrogenated block copolymer, an ethylene-propylene copolymer, and mineral oil.

9. The composition of claim 1, wherein the copolymer of ethylene and a $C_3$-$C_{12}$ alpha-olefin is a linear low density polyethylene.

10. The composition of claim 1, wherein the white pigment is zinc sulfide, titanium dioxide, or a mixture thereof.

11. The composition of claim 1, wherein the ultraviolet radiation stabilizer is a UV absorber selected from the group consisting of benzophenone UV absorbers, benzotriazole UV absorbers, hindered amine light stabilizers, cinnamate UV absorbers, oxanilide UV absorbers, 2-(2'-hydroxyphenyl)-1, 3,5-triazine UV absorbers, benzoxazinone-type UV absorbers, and mixtures thereof.

12. The composition of claim 11, wherein the ultraviolet radiation stabilizer further comprises a cycloaliphatic epoxy compound.

13. The composition of claim 1, further comprising a polybutene.

14. The composition of claim 13, wherein the polybutene has a number average molecular weight of about 700 to about 1,000 atomic mass units.

15. The composition of claim 1, further comprising about 1 to about 30 weight percent of a polyethylene homopolymer, a polypropylene homopolymer, or a mixture thereof.

16. The composition of claim 1, wherein the composition excludes polyethylene homopolymers and polypropylene homopolymers.

17. The composition of claim 1, further comprising about 2 to about 20 weight percent of mineral oil.

18. The composition of claim 1, further comprising a flame retardant selected from the group consisting of magnesium hydroxide, melamine phosphate, melamine pyrophosphate, melamine polyphosphate, and combinations thereof.

19. The composition of claim 1, further comprising a flame retardant comprising magnesium hydroxide and melamine polyphosphate; wherein the composition exhibits a UL94 rating of V-0 at a thickness of 3.2 millimeters.

20. The composition of claim 1, further comprising a flame retardant comprising magnesium hydroxide and melamine polyphosphate; wherein the composition exhibits a UL94 rating of V-1 at a thickness of 3.2 millimeters.

21. The composition of claim 1, comprising a dispersed phase comprising the poly(arylene ether), and a continuous phase comprising the copolymer of ethylene and a $C_3$-$C_{12}$ alpha-olefin.

22. A composition, comprising:
   about 25 to about 45 weight percent of a poly(2,6-dimethyl-1,4-phenylene ether);
   about 20 to about 35 weight percent of a polystyrene-poly(ethylene-butylene)-polystyrene triblock copolymer;
   about 10 to about 30 weight percent of a linear low density polyethylene;
   about 2 to about 10 weight percent of a polybutene;
   about 8 to about 25 weight percent of bisphenol A bis (diphenyl phosphate), resorcinol bis(diphenyl phosphate), or a mixture thereof;

about 4 to about 10 weight percent of magnesium hydroxide;
about 4 to about 11 weight percent of melamine polyphosphate;
about 2 to about 6 weight percent of titanium dioxide;
about 0.1 to about 0.6 weight percent of a cycloaliphatic epoxy resin;
about 0.3 to about 0.7 weight percent of a hydroxyphenyl benzotriazole; and
about 0.6 to about 1.5 weight percent of a bis(piperidinyl) sebacate;
wherein all weight percents are based on the total weight of the composition; and
wherein the composition exhibits
a CIE lightness value, L*, value of about 80 to about 90,
a CIE a* value of about −1.5 to about 0.5,
a CIE b* value of about −2.5 to about 1.5,
a CIELAB color shift, ΔE, of about 0.1 to about 2, measured according to ASTM D2244 after 300 hours exposure to xenon arc exposure according to ASTM D4459, and
a flexural modulus of about 50 to about 100 megapascals, measured at 23° C. according to ASTM D790.

23. The composition of claim 22, wherein the composition exhibits a color shift, ΔE, of about 0.1 to about 2, measured according to ASTM D2244 after 500 hours exposure to xenon arc exposure according to ASTM D4459.

24. The composition of claim 22, wherein the composition exhibits a color shift, ΔE, of about 0.1 to about 2, measured according to ASTM D2244 after 1,000 hours exposure to xenon arc exposure according to ASTM D4459.

25. A method of preparing a thermoplastic composition, comprising:
melt kneading
about 10 to about 45 weight percent of a poly(arylene ether);
about 5 to about 40 weight percent of a hydrogenated block copolymer of an alkenyl aromatic compound and a conjugated diene;
about 10 to about 55 weight percent of a copolymer of ethylene and a $C_3$-$C_{12}$ alpha-olefin;
about 8 to about 25 weight percent of a plasticizer, wherein the plasticizer is bisphenol A bis(diphenyl phosphate);
about 1 to about 12 weight percent of a white pigment; and
about 0.1 to about 5 weight percent of an ultraviolet radiation stabilizer;
wherein the composition comprises less than or equal to 20 weight percent of rubber-modified polystyrene;
wherein all weight percents are based on the total weight of the composition; and
wherein the composition exhibits
a CIE lightness value, L*, value of at least 70 measured according to ASTM D2244, and
a CIE color shift, ΔE, less than or equal to 3 measured according to ASTM D2244 after 300 hours exposure to xenon arc exposure according to ASTM D4459.

26. The method of claim 25, wherein the poly(arylene ether) and the plasticizer are blended with each other before being blended with the hydrogenated block copolymer.

27. The method of claim 25, wherein the poly(arylene ether), the plasticizer, and the ultraviolet radiation stabilizer are blended with each other before being blended with the hydrogenated block copolymer.

28. A method of preparing a thermoplastic composition, comprising:
melt kneading
about 25 to about 45 weight percent of a poly(2,6-dimethyl-1,4-phenylene ether);
about 20 to about 35 weight percent of a polystyrene-poly(ethylene-butylene)-polystyrene triblock copolymer;
about 10 to about 30 weight percent of a linear low density polyethylene;
about 2 to about 10 weight percent of a polybutene;
about 8 to about 25 weight percent of bisphenol A bis (diphenyl phosphate), resorcinol bis(diphenyl phosphate), or a mixture thereof;
about 4 to about 10 weight percent of magnesium hydroxide;
about 4 to about 11 weight percent of melamine polyphosphate;
about 2 to about 6 weight percent of titanium dioxide;
about 0.1 to about 0.6 weight percent of a cycloaliphatic epoxy resin;
about 0.3 to about 0.7 weight percent of a hydroxyphenyl benzotriazole; and
about 0.6 to about 1.5 weight percent of a bis(piperidinyl)sebacate;
wherein all weight percents are based on the total weight of the composition; and
wherein the composition exhibits
a CIE lightness value, L*, value of about 80 to about 90,
a CIE a* value of about −1.5 to about 0.5,
a CIE b* value of about −2.5 to about 1.5,
a CIELAB color shift, ΔE, of about 0.1 to about 2, measured according to ASTM D2244 after 300 hours exposure to xenon arc exposure according to ASTM D4459, and
a flexural modulus of about 50 to about 100 megapascals, measured at 23° C. according to ASTM D790.

29. The method of claim 28,
wherein the
poly(2,6-dimethyl-1,4-phenylene ether) and
the bisphenol A bis(diphenyl phosphate), resorcinol bis (diphenyl phosphate), or a mixture thereof
are blended with each other before being blended with the hydrogenated block copolymer.

30. The method of claim 28,
wherein the
poly(2,6-dimethyl-1,4-phenylene ether),
the bisphenol A bis(diphenyl phosphate), resorcinol bis (diphenyl phosphate), or a mixture thereof,
the cycloaliphatic epoxy resin,
the hydroxyphenyl benzotriazole, and
the bis(piperidinyl)sebacate
are blended with each other before being blended with the hydrogenated block copolymer.

31. An article comprising the composition of claim 1.

32. An article comprising the composition of claim 22.

33. Cable insulation comprising the composition of claim 1.

34. Cable insulation comprising the composition of claim 22.

35. A method of insulating an electrical wire, comprising:
extrusion coating an electrical wire with a composition comprising
about 10 to about 45 weight percent of a poly(arylene ether);
about 5 to about 40 weight percent of a hydrogenated block copolymer of an alkenyl aromatic compound and a conjugated diene;

about 10 to about 55 weight percent of a copolymer of ethylene and a $C_3$-$C_{12}$ alpha-olefin;

about 8 to about 25 weight percent of a plasticizer, wherein the plasticizer is bisphenol A bis(diphenyl phosphate);

about 1 to about 12 weight percent of a white pigment; and about 0.1 to about 5 weight percent of an ultraviolet radiation stabilizer;

wherein the composition comprises less than or equal to 20 weight percent of rubber-modified polystyrene;

wherein all weight percents are based on the total weight of the composition; and wherein the composition exhibits a CIE lightness value, L*, value of at least 70 measured according to ASTM D2244, and a CIE color shift, ΔE, less than or equal to 3 measured according to ASTM D2244 after 300 hours exposure to xenon arc exposure according to ASTM D4459.

36. A method of insulating an electrical wire, comprising: extrusion coating an electrical wire with a composition comprising about 25 to about 45 weight percent of a poly(2,6-dimethyl-1,4-phenylene ether);

about 20 to about 35 weight percent of a polystyrene-poly(ethylene-butylene)-polystyrene triblock copolymer;

about 10 to about 30 weight percent of a linear low density polyethylene;

about 2 to about 10 weight percent of a polybutene;

about 8 to about 25 weight percent of bisphenol A bis (diphenyl phosphate), resorcinol bis(diphenyl phosphate), or a mixture thereof;

about 4 to about 10 weight percent of magnesium hydroxide;

about 4 to about 11 weight percent of melamine polyphosphate;

about 2 to about 6 weight percent of titanium dioxide;

about 0.1 to about 0.6 weight percent of a cycloaliphatic epoxy resin;

about 0.3 to about 0.7 weight percent of a hydroxyphenyl benzotriazole; and about 0.6 to about 1.5 weight percent of a bis(piperidinyl)sebacate;

wherein all weight percents are based on the total weight of the composition; and wherein the composition exhibits a CIE lightness value, L*, value of about 80 to about 90, a CIE a* value of about −1.5 to about 0.5, a CIE b* value of about −2.5 to about 1.5, a CIELAB color shift, AL, of about 0.1 to about 2, measured according to ASTM D2244 after 300 hours exposure to xenon arc exposure according to ASTM D4459, and a flexural modulus of about 50 to about 100 megapascals, measured at 23° C. according to ASTM D790.

37. The composition of claim 1, wherein the hydrogenated block copolymer has a weight average molecular weight of about 200,000 to about 400,000 atomic mass units.

38. The composition of claim 1, wherein the hydrogenated block copolymer and the poly(arylene ether) are present in a weight ratio of about 1.2:1 to about 3:1.

* * * * *